United States Patent [19]
Gibson et al.

[11] Patent Number: 5,758,351
[45] Date of Patent: May 26, 1998

[54] SYSTEM AND METHOD FOR THE CREATION AND USE OF SURROGATE INFORMATION SYSTEM OBJECTS

[75] Inventors: William Gibson, Surrey, England; David R. Marshall, Allen, Tex.; Steve Turner, Middlesex, England; William N. Dawson, Bellevue, Wash.; Patrick M. Hogan, Austin, Tex.

[73] Assignee: Sterling Software, Inc., Dallas, Tex.

[21] Appl. No.: 397,699

[22] Filed: Mar. 1, 1995

[51] Int. Cl.[6] ........................................ G06F 17/30
[52] U.S. Cl. .................. 707/104; 707/103; 707/3; 707/10; 345/348; 345/352; 345/347
[58] Field of Search ............... 395/600, 161, 395/500, 650, 614; 707/104, 103, 3, 10; 345/348, 352, 347

[56] References Cited

U.S. PATENT DOCUMENTS

| | | | |
|---|---|---|---|
| 5,339,392 | 8/1994 | Risberg et al. | 395/161 |
| 5,386,564 | 1/1995 | Shearer et al. | 395/650 |
| 5,491,783 | 2/1996 | Douglas et al. | 395/159 |
| 5,515,524 | 5/1996 | Lynch et al. | 395/500 |
| 5,630,125 | 5/1997 | Zellweger | 395/614 |

*Primary Examiner*—Thomas G. Black
*Assistant Examiner*—Cheryl R. Lewis
*Attorney, Agent, or Firm*—Baker & Botts, L.L.P.

[57] ABSTRACT

The present invention defines a consistent method and system for enabling components in an information system to invoke operations that may be distributed across multiple computing platforms, through the provision and use of executable operations whose behaviors are determined from information stored and extracted from a Catalog (164) using an Operation Definition Manager (82). The stored information is used by a Surrogate Object Definition Module (96) to define a Surrogate Object Type structure which enables execution of any of the operations described within it. A Surrogate Object Manager (94), along with an Operation Connection Manager (104, 118, 130 or 132), is provided which assists the user in developing applications by providing access to the definition of the input and output arguments of the operations included in the Surrogate Object Type structure (244). The present invention further includes an Operation Connection Manager (104, 118, 130 or 132) which, together with the Surrogate Object Manager (94), provides a consistent means for an Operation Requestor (92) to invoke an operation and exchange input and output arguments, independent of the intervening network communication protocol or the hardware platform type, operating system and database management system upon which the operation has been implemented.

20 Claims, 15 Drawing Sheets

| ADD CUSTOMER | operation_type: Composer DPS
execution_name: CUSTOMER.EXE; execution_parameter: "Add" |

INPUT ARGUMENTS:                        OUTPUT ARGUMENTS:

| customer_name | (char 30, mandatory) | customer_number | (char 10) |
| customer_address | (char 60, mandatory) | customer_name | (char 30) |
| customer_phone_number | (char 20) | customer_address | (char 60) |
| | | customer_phone_number | (char 20) |
| | | customer_return_code | (char 01) |
| | | customer_message | (char 30) |

| LIST CUSTOMERS | operation_type: Composer DPS
execution_name: CUSTOMER.EXE; execution_parameter: "List" |

INPUT ARGUMENTS:                        OUTPUT ARGUMENTS:

<none>

| customer_number | {(char 10) repeats} |
| customer_name | {(char 30)} |
| operation_return_code | (char 01) |
| operation_message | (char 30) |

| GET CUSTOMER DETAILS | operation_type: Composer DPS
execution_name: CUSTOMER.EXE; execution_parameter: "Detail" |

INPUT ARGUMENTS:                        OUTPUT ARGUMENTS:

| customer_number | (char 10, mandatory) | customer_number | (char 10) |
| | | customer_name | (char 30) |
| | | customer_address | (char 60) |
| | | customer_phone_number | (char 20) |
| | | operation_return_code | (char 01) |
| | | operation_message | (char 30) |

SYSTEM AND METHOD FOR THE CREATION AND USE OF SURROGATE INFORMATION SYSTEM OBJECTS

TECHNICAL FIELD OF THE INVENTION

This invention relates in general to the field of distributed business information systems development and use.

BACKGROUND OF THE INVENTION

Distributed computing is increasingly being adopted as an effective means of enabling business information systems to respond more rapidly to changes in business needs. Increasingly-powerful desktop computers are used to provide easy-to-use graphical human-computer interfaces to applications modeled on the users perception of the real world and the "objects" they manipulate in the real world. These personal computers also provide local processing of personal or private data. The programs running on these personal computers need to collaborate with programs running on shared "server" computers when common business rule processing or access to shared data is required. These server computers may be large mainframe computer systems, smaller minicomputer systems or shared micro computers. This invention relates to a system and method for one aspect of the enablement of this collaboration.

There is now an increasing demand to improve the responsiveness of the information systems development process to business change. Re-use of existing components in the construction of new systems is widely regarded as a likely means to reduce the time taken to develop new systems and to improve their quality.

Early distributed applications were primarily based on purpose-built collections of cooperating components. In general, these applications were constructed with little thought for their re-usability in other applications of executable components. The use of proprietary protocols for the messages exchanged between components, the lack of standards for describing the format and meaning of arguments passed in the message, and no clear method for division of application functionality, has frequently resulted in components being poorly optimized for re-use.

A component is defined here as an executable module which implements a useful, clearly defined unit of functionality and provides a well defined interface which encapsulates, or hides, the details of its underlying implementation. Such a component, once tested and verified, can be re-used as a form of "building block" in the assembly of, potentially, many different applications.

Components which implement standard sets of business rules and provide access to shared data storage can be combined with application-specific components to achieve the total function of an application. Optimum flexibility is achieved if such business-oriented components are loosely coupled and can be distributed across heterogeneous computing platforms as circumstances dictate.

Loose coupling (where there is no binding except for the duration of the collaboration) and the use of encapsulation are beneficial as it allows individual components to be maintained with minimum impact on each other—unaffected parts of an application can continue to function even if one component is temporarily missing or defective; a new version of a component can be substituted without impact as long as the interface remains the same.

Component to component collaboration normally involves some kind of control and message flow. At any one moment in the collaboration, one component may request the other to provide some kind of service. This creates a relationship between the two components which lasts at least for the duration of the request/response. In the context of this transient relationship, one component is termed the requester and the other the server. In the context of applications composed of large numbers of components, there is often a need to identify higher-level, or more abstract collaborations which are implemented by a series of lower-level collaborations. Thus there is a need for enabling such a higher-level collaboration, through the provision of a set of collaborating lower-level components. To differentiate between the higher-level and lower-level collaborations involved, this document will refer to the component which implements the requested service as an operation, and the component requesting this service as the a requester.

Contemporary distributed computing technologies and concepts allow great flexibility in how the intercommunication between a requester and operation is managed:

The collaborating components may conform to a client to server or a peer to peer model.

The requester and operation may be implemented on homogeneous or heterogeneous platform types.

The request/response may be synchronous (the requester waits for a response) or asynchronous (the requester continues processing, not waiting for a response).

There may be any number of levels of communication-related protocols which ensure that the message and response successfully negotiate any intermediate network and are successfully encoded and decoded by each component.

More recently these ideas have resulted in the formulation of standard message brokering architectures. Examples of these object request brokers (ORBs) include OLE and the proposed Distributed OLE from Microsoft, and implementations of the common object request broker architecture CORBA specification from the Object Management Group.

These technologies provide the distributed business information systems "landscape" within which this invention fits.

However, for the collaboration between the requester and the operation to be successful, regardless of the above technologies and architectures, requires that they share knowledge of the business meaning, semantics and format of the content of the messages exchanged between them.

For example, an operation which determines whether or not a financial transaction will exceed a customer's credit-balance is likely to require the identifier of the customer record and the amount of the transaction as arguments. It is vital that both the requester and the operation are able to exchange the required items of data in a mutually understandable manner. Furthermore, if there are rules governing the permitted values for some or all of the arguments, or there are other pre-conditions for execution of the operation, it is important that these are exposed to the developer of the requester so that data values may be checked in the requester logic prior to the operation being requested.

Various alternative approaches can be used to ensure this compatibility exists between the requester and the operation:

1. If the two components are written by hand, the programmer writing the requester code can refer to the operation specification or source code for guidance—this is both error prone and time-consuming.
2. If both requester and operation are constructed using a computer aided software engineering (CASE) tool, the components can be created from a common electronically-stored specification, thus ensuring compatibility (TI's CASE tool, Composer by IEF works this way). While this process is effective, it requires that all the components be created by tools which have access to the stored specification and so is less suited to ad-hoc development by more business-oriented staff working with a less sophisticated tools.

3. The message can include information which describes the meaning, format and semantics of each argument, thereby creating what has been referred to as a semantic data stream [see, for example, the book *Business Objects* by Oliver Sims and published by McGraw-Hill in 1994, herein incorporated by reference in its entirety]. While this approach allows some flexibility in the formatting and decoding of the message, it has several drawbacks:

a. It significantly increases the volume of information being exchanged in both directions between requester and operation—a detailed definition of the semantics of each variable in a message stream could occupy many times the space of the variable itself.
   b. It is still not possible to determine in advance of execution the purpose of the operation or what arguments are required by it and what, if any, preconditions apply to these arguments. (The semantic data stream only describes the arguments returned by the operation and does not describe the arguments required by it on input).
   C. There is no cross-referencing between the semantics and business meaning of the arguments of one operation and those of another, making it difficult to ensure consistency between operations.

4. A definition of the operation interface and its requirements can be stored separately from the operation in a file referenced by application developers. This file form may use a standard language, often referred to as interface definition language (IDL). Implementations of this approach have only provided a limited definition of the functions and their interface arguments and make no attempt to define or recognize common meaning among the arguments of multiple operations, or to provide information regarding permitted values and other validation criteria. IDL-based systems require that the components defined in the IDL are implemented in a homogeneous operating environment, although these components may re-direct a request to some other operating environment.

Furthermore, most of the approaches described hereinabove are expressed and accomplished at a detailed technical level, requiring developers with significant expertise and knowledge of low-level programming or communications methods and protocols.

Thus, there is a need for a method and system which make the assembly of information systems from reusable components more amenable to less technically-skilled and more business oriented personnel by providing a high level description of reusable components and by providing a method and system for easily relocating the reusable components and assembling them into applications.

SUMMARY OF THE INVENTION

In accordance with one embodiment of the present invention a shareable Catalog is provided which includes descriptions of reusable components, or operations, and definitions of their input and output arguments together with information which will enable their location and execution.

This embodiment further includes a Surrogate Object Definition Module, a Surrogate Object Manager, a Catalog Manager and a Connection Manager. A developer of an application is able to browse among all the available operations in the Catalog and select those required by an application under construction. The Surrogate Object Definition Module then generates an occurrence of a Surrogate Object Type structure which includes the description of the selected operations, together with the descriptions and definitions of each of the arguments required and returned by each of the selected operations.

Each such Surrogate Object Type structure conforms to a predetermined form regardless of the operations described therein or the hardware platform type, operating system, database management system or language used in the implementation of each of the selected operations.

This embodiment further includes the Surrogate Object Manager which interprets the information stored in the Surrogate Object Type structure and provides a set of predefined functions and which, when executed, enable the contents of the Surrogate Object Type structure to be examined and the operations described therein to be executed. As a result, the developer of an Operation Requester need only understand this set of standard functions in order to be able to develop the operation request logic of an application, regardless of the type of operation being invoked or where or how the operation is implemented.

In another embodiment of the present invention the data models of the Catalog and the Surrogate Object Type structures provide a rich set of inter-related record types that enable the arguments of the operations to be expressed in terms of entity types and predicates from a common data model of the business concepts manipulated by the operations.

Furthermore, in yet another embodiment of the present invention, if operations are selected and the Surrogate Object Type structure is defined to represent a particular identifiable element in the information system domain, then the present invention provides an automated means of creating Surrogate Object Instances, each one of which represents an occurrence of the Surrogate Object Type. For example, if a Surrogate Object Type is defined to represent a customer, i.e. it includes a collection of operations associated with manipulating information about a customer, the Surrogate Object Instances created by the present invention would represent individual customers.

Another embodiment of the present invention further provides a consistent and common access mechanisms to the instance data (e.g. the actual value of a customer's name) as it does to the type-level information (e.g. the data which describes the properties of customer name, such as its length and data type). This has the advantage of providing an automated method and system for generating a significant part of the application logic that might otherwise have to be written manually into every application, including the logic responsible for composing, organizing, identifying, matching and relating sets of instance data.

BRIEF DESCRIPTION OF THE DRAWINGS

For a better understanding of the present invention, reference may be made to the accompanying drawings, in which:

FIGS. 8 and 9 show exemplary definitions of operation arguments and other properties used to illustrate one embodiment of the present invention;

DETAILED DESCRIPTION OF THE INVENTION

The present invention provides a method and system of developing applications using reusable components, or executable operations, which are executed upon request of the applications. The programmed elements of the present invention, the flow between them and the methods required are described in the following sections and illustrated in the attached drawings and flowcharts.

Figure 1:
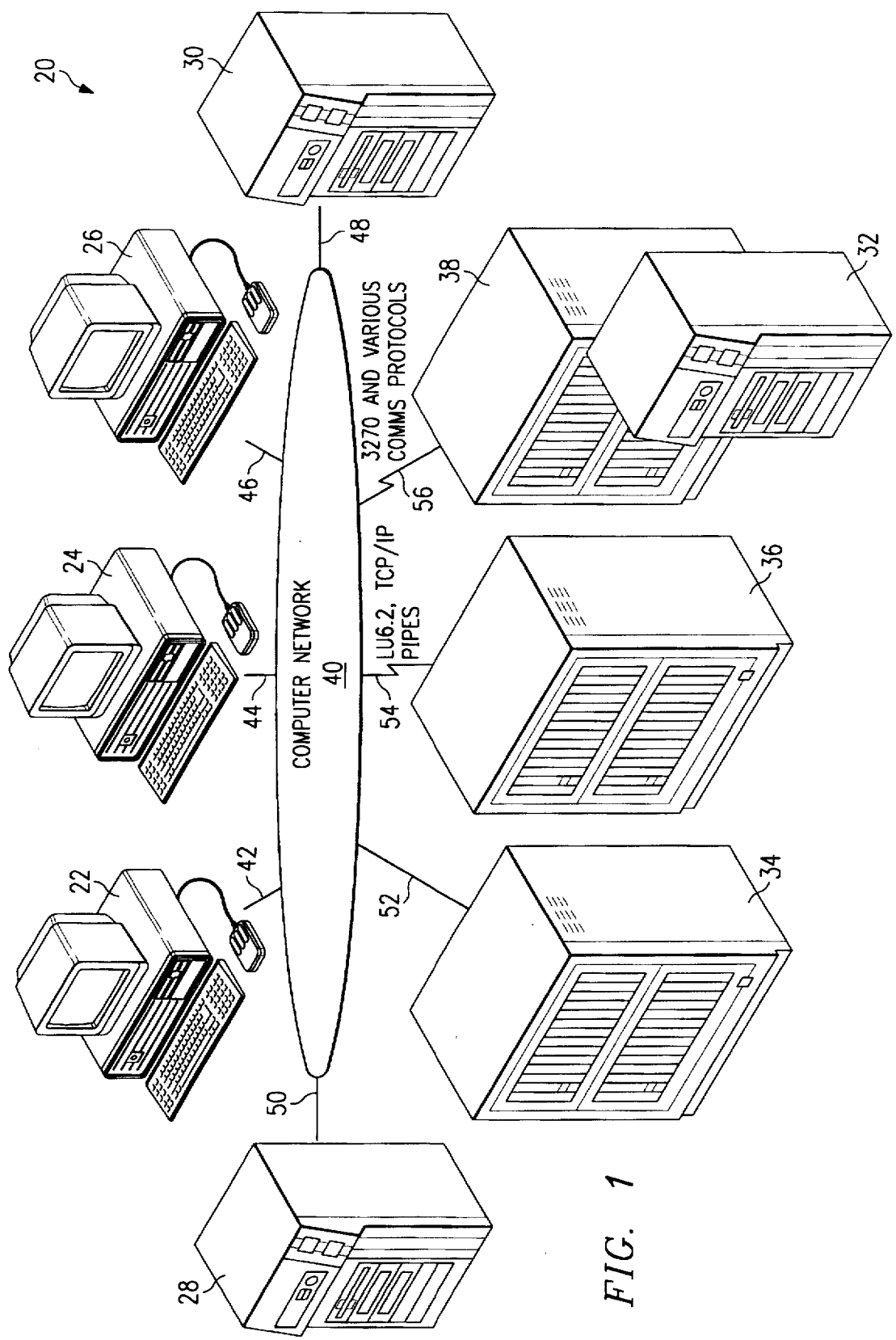
FIG. 1 is an illustration of an exemplary distributed, heterogeneous computer system.

An exemplary configuration of computer hardware for a distributed computer system using the elements of this invention is shown in FIG. 1 and described hereinbelow. FIG. 1 shows a set of different types of homogeneous computers operable to communicate electronically via computer network 40. The computers may be located in the same building or facility and connected via a local area network, or may be distant from each other and connected via a wide-area network or by use of dial-up modems across telephone lines.

Figure 2:
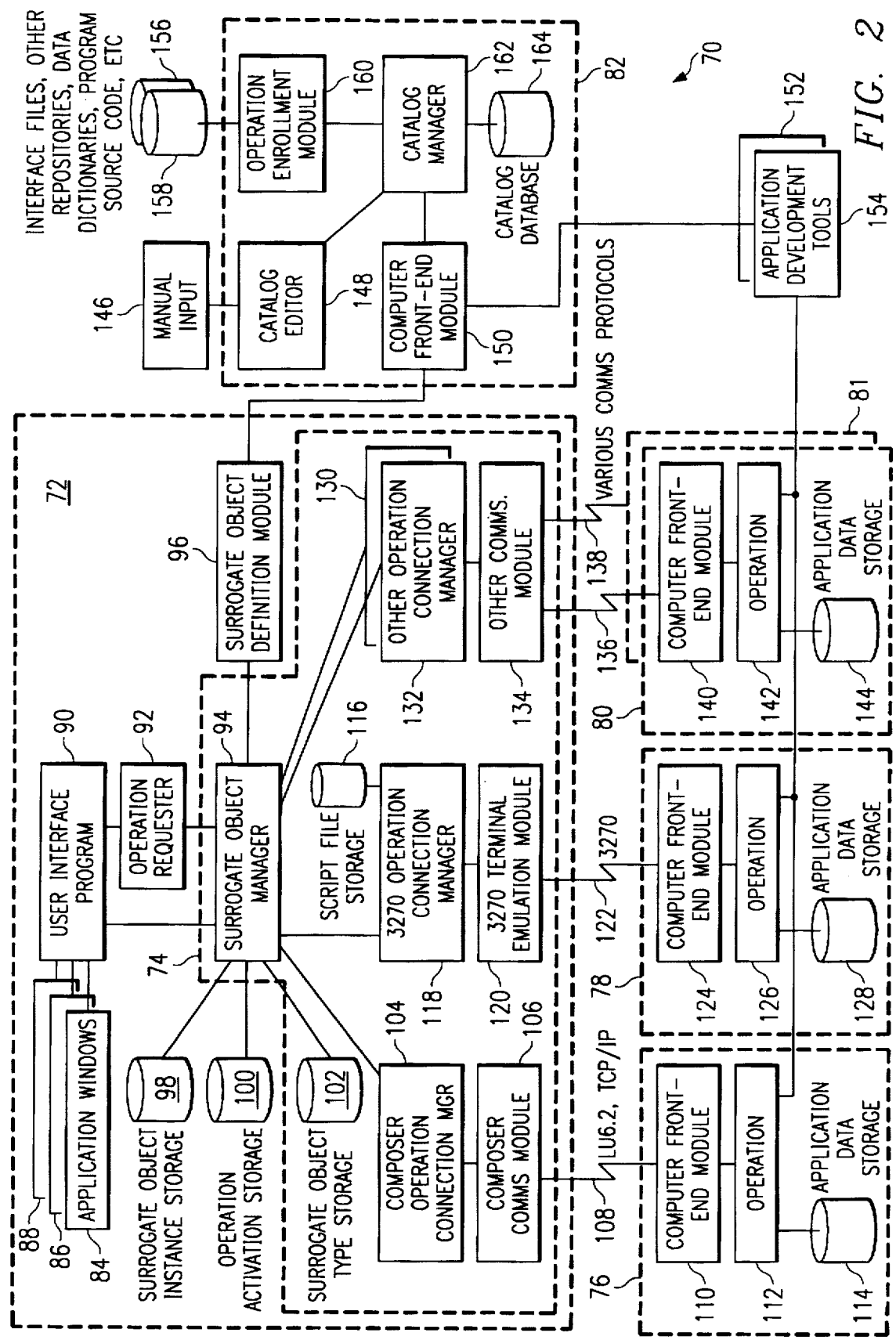
FIG. 2 is a block diagram illustrating one embodiment of the present invention.

Three different classes of computer are depicted in FIG. 1 and could be used in an exemplary configuration. The classes of computers include workstations 22, 24 and 26, mini-computers 28, 30 and 32, and mainframes 34, 36 and 38. An exemplary arrangement of the elements of the present invention across the computers in FIG. 1 is depicted in FIG. 2. FIG. 2 is described in more detail hereinbelow.

Personal computer workstations 22, 24 or 26, provide a local processor, data storage and a bitmapped graphical display device for display of application data represented as characters and graphical symbols within an application windows. Each of the personal computer workstations 22, 24 and 26 also include a user pointing and selection device, such as a mouse, to facilitate user interaction with displayed objects and a keyboard to facilitate character entry.

In one embodiment of the present invention, the processor of the personal computer workstation 22, 24 or 26 is used to execute the instructions comprising the user interface program 90, the Operation Requester 92 and Surrogate Object Definition Module 96 as shown at 72 in FIG. 2.

The Surrogate Object Manager 94 and the exemplary Operation Connection Managers 104, 118 and 130 of the present invention are also installed and execute on the processor of each of personal computer workstation 22, 24 or 26 as shown at 72. It is further contemplated, however, that the Surrogate Object Manager 94 and the exemplary Operation Connection Managers 104, 118 and 130 are installed and execute as shared resources among a group of users on the processor of a networked mini-computer server 28 or 32 as shown at 74 in FIG. 2.

Surrogate Object Type structures, as shown at 244 in FIG. 4 and discussed in more detail hereinbelow, are created in advance of their use in the construction of an application and stored in Surrogate Object Type storage 102 on individual user's personal computer workstations 22, 24 or 26. In another embodiment of the present invention, the Surrogate Object Type storage 102 is stored on a shareable mini-computer 28 or 32. The latter embodiment of the present invention is more likely if the Surrogate Object Manager 94 is also installed and executes on the mini-computer server 28 or 32. It is contemplated, however, that the invention is used by individuals to define the Surrogate Object Type structures 244 in an ad hoc manner to support their own needs. Thus, in the preferred embodiment of the present invention, the Surrogate Object Manager 94 and the Surrogate Object Type storage 102 are stored on the personal computer workstation 22, 24 or 26.

In the preferred embodiment of the present invention, Operation Activation and Surrogate Object Instance structures are stored in the memory of the personal computer workstation 22, 24 or 26 during execution and on the local disk of the personal computer workstation 22, 24 or 26 if required to be persistent between executions.

In the preferred embodiment of the present invention, the exemplary networked, shareable, mini-computer server 30 provides a processor for execution of the Catalog Manager 162, the Operation Enrollment Module 160, the Catalog Editor 148, and the Computer Front-End Module 150 and provides further data storage for the Catalog database 164.

Shareable mini-computer 28 or 30 or mainframe computer 34, 36 or 38 are used to execute operations [using exemplary Application Development Tools 152 and 154] and to store the business data manipulated by these operations and stored in exemplary data stores 156 and 158. Such operations and data stores are developed using exemplary Application Development tools 152 and 154.

The present invention provides a Surrogate Object Definition Module 96 which, using information stored in the Catalog database 164 generates a Surrogate Object Type structure 244 which is stored in the Surrogate Object Type storage 102. The Surrogate Object Type structure 244, the Operation Activation structure and the Surrogate Object Instance structure, derived from the Surrogate Object Type structure 244, are all used in the collaboration between the Operation Requester 92, the Surrogate Object Manager 94 and the exemplary Operation Connection Managers 104, 116, 130 and 132 to enable an application to invoke an executable operation.

The executable operation and user interface program 90 are to a large extent examples of modules used in exemplary applications, although the present invention provides some guidelines for certain aspects of their design and construction where this impacts their use with the present invention. The Operation Enrollment Module 160 and the Catalog Editor 148 are also elements of the present invention and are used to populate and maintain the information in the Catalog database 164.

The preferred implementation of the present invention uses Microsoft Windows OLE (object linking and embedding) and OLE Automation standards and guidelines for component design of the Operation Requester 92, the Surrogate Object Manager 94 and the exemplary Operation Connection Managers 104, 118, 130 and 132. The preferred implementation of all records (of all types) for in-memory use is as OLE component object model (COM) objects. However, the principles and concepts illustrated in the present invention are not dependent on the use of the Microsoft proprietary technology for implementation.

It is further contemplated that other object request brokering and object management technology, including that which conforms with the CORBA (common object request broker architecture) from OMG (Object Management Group) or other standard or proprietary architectures would be equally suitable alternatives for implementation of this invention.

Operation

An operation is an executable logic module in a computer system which provides some useful information processing service and offers a well defined execution interface comprising arguments required as input and returned as output. An operation may be implemented on any platform type, operating system, and database management system and in any source code language provided it can be invoked by an appropriate Operation Connection Manager such as exemplary Operation Connection Managers 104, 118, 130 and 132.

More than one operation may be implemented in a single executable module, in which case, the module is referred to as an "operation package". If multiple operations are packaged together it must be possible to execute each operation individually within the package.

Operations may be self-contained or they may call other executable modules. An operation in the course of execution may access a persistent data store device to store or retrieve data. An operation may be constructed specifically to provide a "wrapper" for some other unit or units of logic, in which case it will provide some form of data transformation between the representation of its input and output arguments and the input and output arguments of the wrapped module. This approach is an effective means of integrating code modules written at some time earlier.

Information describing an operation, including definition of its input and output interface arguments, is stored in the Catalog database 164. The present invention thus only needs to determine how to invoke an operation, including a determination as to what data is required as input and what data, if any, is returned. No details of the internal workings of an operation are required other than the descriptive information provided to assist a potential user of the operation to determine its purpose.

In a business information system, an exemplary operation could be anything from a simple currency conversion or interest calculation routine, to a module which records the entry of a customer order in a database or extracts a list of products stored in a warehouse from a database.

Operation Requester

Any module which needs to access an operation is, in that context, an Operation Requester 92. In the present invention, the Operation Requester 92 must be operable to communicate with the Surrogate Object Manager 94 but does not necessarily have to be on the same computer as the Surrogate Object Manager 94.

An exemplary use of the invention includes the use of operations implemented on a mini-computer or mainframe server computer and Operation Requesters 92 implemented as modules either called by or within a user interface program 90 running on a client workstation 22, 24 or 28 which provides an application window 84, 86 or 88.

In the preferred Microsoft Windows OLE implementation, tools which offer programmable use of OLE-automation can be used to create the Operation Requester 92. Thus the Operation Requester 92 might be implemented as a macro in the macro language of a desktop tool such as Microsoft's Excel, or as a subroutine in a programming languages such as Microsoft's Visual Basic or Visual C++. Thus, the present invention enables the use of tools such as Excel and other desktop productivity products to build Operation Requesters 92. This reduces the skill level required for a user to participate in application development and allows more business-oriented users to "assemble" operations into their own applications.

Catalog

The Catalog database 164 is a shared data storage facility which includes descriptions of executable operations and the definitions of their execution interface requirements. Management of the data stored in the Catalog database 164 is enabled by the Catalog Editor 148 which provides a user interface for entering, displaying and updating Catalog records and properties, the Catalog Manager 162 which provides a set of access and data storage functions that allow Catalog records in the Catalog database 164 to be added, updated and deleted while at all times enforcing the rules imposed by the Catalog data model 180 shown in FIG. 3 and described in more detail hereinbelow.

Physical storage of the Catalog records is managed by the interaction of the Catalog Manager 162 with a database management system in which the Catalog database 164 is implemented.

The Catalog 82 enables the representation of a unified high-level business model of the arguments of multiple operations where those operations manipulate common facts in their input and output arguments. This unified representation is achieved by associating individual operation arguments with common predicates of shared entity types. This requires specific types of information to be available in the Catalog 82.

Figure 3:
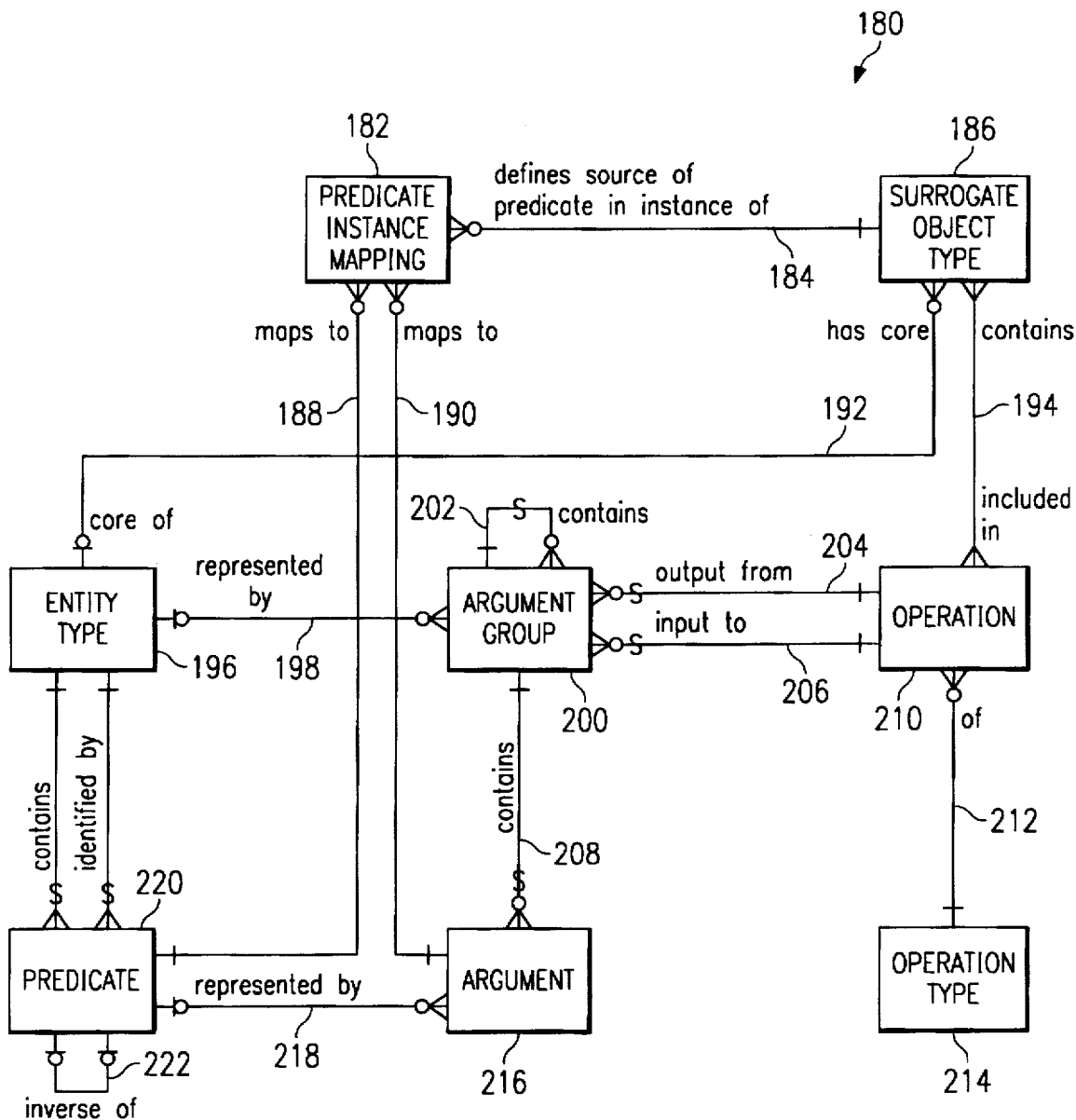
FIG. 3 is one embodiment of a data model of the Catalog database used in one embodiment of the present invention.
Figure 10:
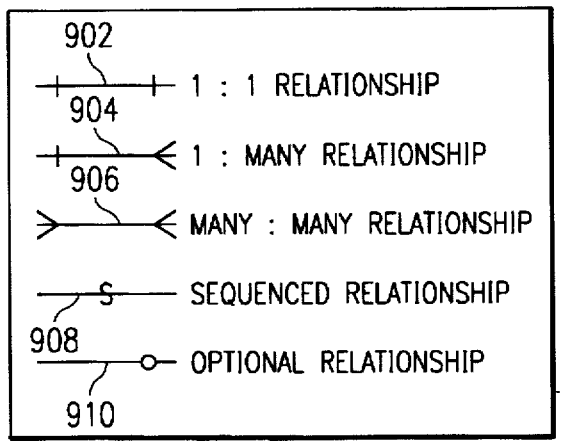
FIG. 10 defines the object connector symbols used in the exemplary data models shown in FIGS. 3 and 4 in one embodiment of the present invention.

FIG. 3 is a diagrammatic representation of the preferred data model for the record types stored within the Catalog 82, depicting the types of data stored and the relationships between them. In FIG. 3, boxes are used to represent logical record types and the lines between them represent types of relationship between these records. The relationship lines shown in FIGS. 3 and 4, as described in FIG. 10, further indicate optionality, cardinality and sequence requirements of the relationships.

The physical data model of an implementation of the Catalog database 164 may vary from that described above for reasons of optimizing storage or improving retrieval performance. It is contemplated that different implementations of the Catalog database 164 of the present invention may include the use of flat files, relational databases or object oriented databases. However, any implementation must provide storage functions that support the conceptual data model of the Catalog database 164 as illustrated in FIG. 3. The preferred implementation of the present invention uses a relational database and implements each record type as a table and each relationship using a foreign key pointer.

The Catalog database 164 record types and their properties are the same as those required in the Surrogate Object Type structure 244 and are described hereinbelow. There are, however, small but crucial differences between the data model of the Catalog shown in FIG. 3 and the data model of the Surrogate Object Type structure 244 shown in FIG. 4.

Operations can be defined in the Catalog database 164 before any Surrogate Object Type structures 244 have been defined, thus making the relationship at 194 between the operation 210 and the corresponding instance of the Surrogate Object Type 186 optional in the Catalog database 164.

In addition, in the Catalog database 164, the Surrogate Object Type structures 244 can overlap with one another with regards to the operations they include and may have the same entity type 196 as the core, as shown by the relationship at 192. Thus, in the Catalog data model shown in FIG. 3, the relationship at 192 between entity type 196 and surrogate object type 186 and the relationship at 194 between the operation 210 and the surrogate object type 186 allow associations with many instances of the surrogate object type 186.

It is contemplated that the present invention may use the information stored in some other Catalog or development repository as long as it is possible to determine the operation definition information required by the present invention from the information stored in the other Catalog or repository. Alternatively, the operation definition information from some other Catalog or repository can be loaded into the Catalog database 164 using the Operation Enrollment Module 160. Such loading of operation definition information is referred to as "enrolling" and is described in more detail hereinbelow.

Enrolling Operation Definitions into the Catalog

The Catalog database 164 may be populated manually using the Catalog Editor 148.

The Catalog database 164 may also be populated directly by development tools if the implementation of the Catalog database 164 is a repository shared with automated application development tools 152 and 154 which use the repository to store information during the process of developing the operations. Such tools are often referred to as computer aided software engineering (CASE) tools.

The Catalog database 164 can further be populated from some other electronically held source of information. Such a source includes some other development repository or some other suitable external source of operation definition information. A wide variety of possible external sources could be used, including the repositories and definition files used by various CASE tools, data dictionary products and existing program source code, or through some direct interface with an executing operation capable of describing its own structure in a manner suitable for capture and enrollment.

Enrollment of such externally held operation definition information is accomplished with an Operation Enrollment Module 160. Each different source of information may require a specially designed Operation Enrollment Module 160 which is capable of mapping the operation definition information from the source format into the format required by the Catalog database 164.

Operation Enrollment Module

The Operation Enrollment Module 160 assists by automating some or all of the enrollment of operation definitions into the Catalog database 164 or repository from an external electronically held source. Potential sources include CASE tool repositories, data dictionaries and program source code. Operation enrollment is also possible from "self-describing" operations that offer functions that return definitions of their input and output arguments.

Operation enrollment involves the transformation of information from a source-specific data representation into the representation supported by the Catalog database 164 (see the Catalog database 164 data model shown in FIG. 3.).

As a result, different types of source are likely to require different Operation Definition Modules.

One function of the Operation Enrollment Module 160 is the construction of a arguments of operations being enrolled. To achieve this, the model is built up with each successive operation as it is enrolled.

The arguments of each operation being added are matched to predicates 220 already in the Catalog database 164 and either associated with existing predicates 220 and entity types 196 in the Catalog data model as shown in FIG. 3 or, if necessary, new predicates 220 and entity types 196 are added, or in the case where the arguments are determined to be operation specific, then no predicate is created. This matching is done both on first enrollment of the operations and on subsequent re-enrollment if the operation has been updated.

Matching is based on the source_names on the Catalog database 164 records for operation, argument groups and individual arguments, as well as on a comparison of individual argument properties with predicate properties.

Depending on the quality of information available in the source, operation enrollment may be more or less automated. If the source holds information in the same or similar format to the information in the Catalog database 164, a high degree of automation is likely. Otherwise, enrollment will require operator assistance to resolve inconsistencies or to augment the information available from the source. An implementation of the Catalog Enrollment Module 160 may enable operator intervention to occur during the course of enrollment or the Catalog Editor 148 can be used afterwards to modify the enrolled operation data.

Catalog Editor

Manual input of operation definition information is supported by the Catalog Editor 148 which provides a user interface 146 that allows direct entry of Catalog database 164 records in situations where it is deemed impractical or undesirable to develop an automated operation enrollment capability. The Catalog Editor 148 is also used to maintain operation definitions once enrolled, regardless of their original source. Catalog database 164 record properties can be added or modified, and associations between operation arguments and predicates can be added or deleted to reflect increased or changed understanding of the business meaning of the arguments of operations.

Surrogate Object Type Definition Module

Creation of a Surrogate Object Type structure 244 involves copying a collection of records and their properties from the Catalog database 164.

The Surrogate Object Definition Module 96 provides a user interface that enables the operator to browse and examine operation descriptions and definitions held in the Catalog database 164. The operator then selects one or more of these operations and requests these be used to create a Surrogate Object Type structure 244. This is done through interaction of the Surrogate Object Definition Module 96 with functions of the Surrogate Object Manager 94 which causes the selected operations and their related objects to be replicated from the Catalog database 164 into a Surrogate Object Type structure 244 which is stored in Surrogate Object Type storage 102.

The Surrogate Object Definition Module 96 is also used to maintain previously constructed Surrogate Object Type structures 244. It enables the operator to examine and modify the existing Surrogate Object Type structure 244 contents, and if required, to update existing or add new operation definitions from the Catalog database 164.

The Surrogate Object Definition Module 96 is also used to enable the operator to record whether or not instance mapping support is to be enabled for a Surrogate Object Type structure 244. If instance mapping support is enabled, the Surrogate Object Definition Module 96 permits the operator to examine the input and output arguments of each operation included in the Surrogate Object Type structure 244, and to define which arguments will be mapped to predicate values in a Surrogate Object Instance.

Surrogate Object Type definitions, including instance mapping information, can also be stored back into the Catalog database 164, thus enabling these definitions to be re-used by others.

However, if the record structure of the Catalog database 164 or repository differs from that of the Surrogate Object Type structure 244 stored in the Surrogate Object Type structures storage 102, and as long as the meaning of the data stored in the Catalog database 164 or repository corresponds to or can be mapped to the meaning of the information required in the Surrogate Object Type structure 244, then the Surrogate Object Type Definition Module 96 can be designed to apply appropriate data transformations to the information extracted from the Catalog database 164 or repository, thus enabling creation of the Surrogate Object Type structure 244 records as required.

Surrogate Object Manager (SOM)

The Surrogate Object Manager 94 is module which implements a set of externally addressable functions which in turn provide services that manipulate occurrences of the three structure types created in the course of using the present invention: the Surrogate Object Type structure 244; the Operation Activation structure and the Surrogate Object Instance structure. The Surrogate Object Manager 94 provides access to the data held in these three data structures.

Functions implemented by the Surrogate Object Manager 94 are described under the structure type headings hereinbelow in Tables 1–3.

TABLE 1

Surrogate Object Type Functions

| Name | Description |
| --- | --- |
| Create SOT Structure | Replicates a set of Catalog database 164 records to create a Surrogate Object Type structure 244. |
| Save SOT Structure | Saves a complete Surrogate Object Type structure 244 to the Surrogate Object Type Storage file 102. |
| List SOT Structures | Returns a list of saved Surrogate Object Type structures 244. |
| Load SOT Structure | Restores a saved Surrogate Object Type structure 244 ready for use by the Surrogate Object Manager 94. |
| Get SOT Details | Returns properties of the root surrogate object type record 314 within the current Surrogate Object Type structure 244. |
| Get List of Operations | For the current Surrogate Object Type structure 244, returns the list of operations it includes. |
| Get Operation Details | For a specific operation, returns the operation properties. |
| Get Operation Type | For a specific operation, returns the operation type and its properties. |
| Get Input Arguments | For a specific operation, returns the set of its input argument definitions. |
| Get Output Arguments | For a specific operation, returns the set of its output argument definitions. |
| Create Operation | For a specific operation, initiates the operation invocation process; |
| Activation | loads the Surrogate Object Type structure 244, if not already loaded, creates an Operation Activation structure with the Operation Activation record property activation_status = "in preparation" and returns its activation_ID. If a SOI.identifier is provided, will map |

TABLE 1-continued

Surrogate Object Type Functions

| Name | Description |
| --- | --- |
| | the core entity identifier and any other instance-mapped predicate values to argument values in the Operation Activation structure. |
| Get List of OpActs | For a specific operation, returns a list of current Operation Activation structures from the Operation Activation Storage file 100. |

TABLE 2

Operation Activation Functions

| Name | Description |
| --- | --- |
| Put Input Argument Value | For a specific Operation Activation and input argument and supplied value, creates an input argument value. |
| Get Input Argument Value | For a specific Operation Activation and input argument, returns the input argument value. |
| Validate Input Argument | For a specific Operation Activation and input argument and input argument value, causes the Surrogate Object Manager 94 to evaluate the argument validation_rule, returns the validation_status and any validation_message. |
| Validate Operation Input | Requests the Surrogate Object Manager 94 to evaluate the operation input validation rule, returns a validation status and any validation message. |
| Start Operation Execution | For the specified Operation Activation, causes the correct Operation Connection Manager 104, 118, 130 or 132 to be started and operation execution to be initiated. Activation_status is set to "in progress". Takes two additional parameters: 1) callback_pointer - pointer to a user-provided module, pointer is stored as a property of the operation activation record, if provided, is used by the Operation Connection Manager 104, 118, 130 or 132 on operation completion or if an error occurs; 2) async/sync_flag - indicates if operation execution is asynchronous or synchronous, if synchronous the function returns only after operation execution is complete or an error occurs. With these two parameters, the function offers the Operation Requester 92 three operation-calling alternatives: asynchronous with polling; asynchronous with call-back; and synchronous. |
| Put Output Argument Value | For a specific Operation Activation and output argument, creates an output argument value. |
| Get Output Argument Value | For a specific Operation Activation and output argument, returns the output argument value. |
| Get Activation Status | For a specific Operation Activation, returns the activation_status. |
| Update Activation Status | For a specific Operation Activation, updates the activation_status and activation_message. |
| Map Operation Output to Instances | Maps surrogate object instances from the output arguments of an operation. Invoked after operation execution. For the specified operation, if the instance_mapping_flag is "no" it performs no function. Otherwise, for a specific SOT.name, operation.name and activation_ID, matches output argument values of the arguments which are associated with the identifying predicates of the Surrogate Object Type's core entity type against corresponding predicate values of entities in the Surrogate Object Instance structure. For each match found, it maps the argument |

TABLE 2-continued

Operation Activation Functions

| Name | Description |
|---|---|
| | values for all instance-mapped arguments to the corresponding entity's predicate value slots. If no match is found, a new Surrogate Object Instance and core and other entities are created and their predicate value slots populated as above. If any instance mapping takes place the instance_mapping_flag on the operation activation record is set to "yes". |

TABLE 3

Surrogate Object Instance Functions

| Name | Description |
|---|---|
| Get List Of SOIs | For a given SOT.name, returns a list of the SOI.identifiers, and identifying predicate values of the core entity of each. |
| Get SOI Details | For a given SOT.name and SOI.identifier, returns core entity properties and its predicate values and their properties. |
| Get Related Entity | For a given entity and predicate.name, returns one or more entity.names for the entity or entities paired according to the relationship. |
| Get Predicate Value | For a specified entity and predicate.name, retrieves the predicate value and its properties. |
| Save SOI Structure | For the specified SOT.name, saves the entire SOI structure to persistent storage in the Surrogate Object Instance Storage 98. |
| Load SOI Structure | For the specified SOT.name, loads an SOI structure from persistent storage in the Surrogate Object Instance Storage 98. |

Surrogate Object Type Structure

A Surrogate Object Type structure 244 is a named collection of records that describes one or more operations and describes and defines their input and output arguments. A Surrogate Object Type structure 244 is created by the Surrogate Object Definition Module 96 from information extracted from the Catalog database 164.

It is preferred that each Surrogate Object Type structure 244 is stored in a suitable persistent form in the Surrogate Object Type Storage file 102.

The preferred storage implementation uses OLE structured storage, enabling a Surrogate Object Type structure 244 to be stored as an embedded object within an OLE compound document file. This enables the Surrogate Object Type structure 244 to be stored together with the Operation Requester 92 and other parts of the application. It is preferred that each Surrogate Object Type structure 244 is stored independently. As a result, information in one Surrogate Object Type structure 244 may be duplicated in another. This duplication enables storage and retrieval times to be optimized and ensures that each structure is always complete and usable, with no dependency between structures.

A Surrogate Object Type structure 244 may be created to represent some type of element of significance to the business in which case it provides a surrogate "business object" or "business object type" (BOMSIG reference). Examples of this kind of use include Surrogate Object Type structures 244 created to represent a customer, an order form or an insurance proposal. The operations included in a customer Surrogate Object Type structure 244 may include Add_Customer, Get_Customer_Credit_Rating, and Change_Customer_Details.

Alternatively, a Surrogate Object Type structure 244 may be created as a task-related object, combining the operations required to service the needs of some computer or user task.

Furthermore, a Surrogate Object Type structure 244 may be created to provide a set of domain-related services and may further include a set of operations which manipulate values for date and time, or provide currency conversion, or provide standard algorithms such as tax or interest calculation, or provide utility functions, such as string searches, spell checking, or printing.

Surrogate Object Type Data Model

Figure 4:
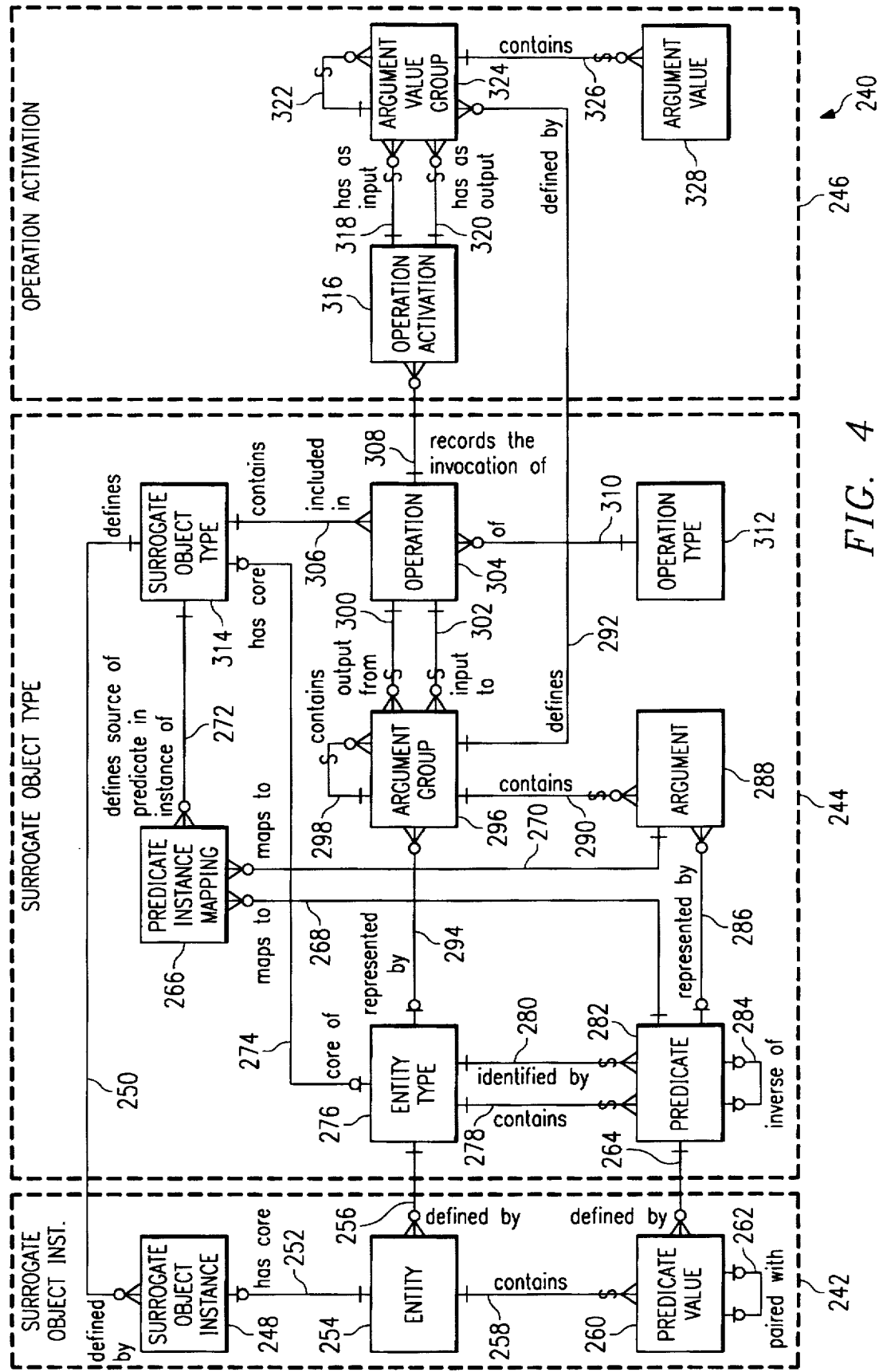
FIG. 4 is one embodiment of a data model of the Surrogate Object Type, the Surrogate Object Instance and the Operation Activation structures as implemented in one embodiment of the present invention.

Each of the record types within the Surrogate Object Type structure depicted at 244 in FIG. 4 is described hereinbelow together with a list of the relationships they participate in and details of their required properties.

Surrogate Object Type Record

The surrogate object type record 314 holds the definition of the Surrogate Object itself and provides the root record for the other record types in the Surrogate Object Type structure 244. When written thus, "Surrogate Object Type" the term refers to the structure; when written thus, "surrogate object type", the term refers to the root record type within such a structure.

The surrogate object type record 314 always includes one or more operations represented by an operation record 304. These are the operations which can be invoked from the Surrogate Object Type structure 244.

A surrogate object type record 314 may also include one or more instances of the predicate instance mapping record 266. The surrogate object type record 314 is required if instance mapping is enabled for the Surrogate Object Type structure 244. An instance of the predicate instance mapping record 266 exists for each instance of the argument record 288 and is used as a source of instances of the predicate value record 260 in the Surrogate Object Instance structure 242. The same instance of the predicate record 282 can be sourced from more than one instance of the argument record 288 of more than one instance of the operation record 304.

Instances of the surrogate object type record 314 may have only one core instance of the entity type record 276 which is optional. A core instance of the entity type record 276 is required if instance mapping is enabled for the Surrogate Object Type structure 244. The instance of the entity type record 276 indicates the type of thing upon which the Surrogate Object Type structure 244 is based. The identifier of the instance of the entity type record 276 is used as the identifier of Surrogate Object Instance structures 242 based on the current Surrogate Object type structure 244.

| Property | Description |
|---|---|
| name | Meaningful name for the Surrogate Object Type structure 244. |
| description | Describes the purpose of the Surrogate Object Type structure 244. |
| instance_mapping_flag | Indicates if instance mapping has been requested for the Surrogate Object Type structure 244. Value "yes" indicates instance mapping is enabled. |

Operation Record

Instances of the operation record 304 store the definition of an executable operation intended to be accessible using the present invention.

An instance of the operation record 304 is always included in an instance of the surrogate object type object 314.

An instance of the operation record 304 is always of only one operation type record 312. Different instances of the operation record 304 within the Surrogate Object Type structure 244 may be associated with different operation type records 312.

An operation sometimes outputs one or more sequenced argument groups 296, shown by the "output from" relationship at 300. The "output from" relationship at 300 and the "contains" relationship at 290 between argument record 288 and argument group record 296 are sequenced so that the sequence that the individual output arguments occur in can be retained.

An operation sometimes inputs one or more sequenced argument groups, shown by the "input to" relationship at 302. The "input to" relationship at 302 and the "contains" relationship at 290 between argument record 288 and argument group record 296 are sequenced so that the sequence that individual input arguments occur in can be retained.

| Property | Description |
| --- | --- |
| name | Meaningful name that the operation is known by, should be understandable to a business person. Identifier - unique within the Catalog database 164. |
| source_name | Optional. A name used in the original source. May be used by Operation Enrollment Modules 160 to assist matching in cases of re-enrollment. |
| description | Describes the intended usage of the operation. |
| execution_name | The name or other identifier required by the Operation Connection Manager 104, 118, 130 or 132 at runtime to enable the operation to be located and executed. |
| execution_parameter | Information accessible to the Operation Connection Manager 104, 118, 130 or 132 at runtime to enable correct location and execution of the operation. |
| input_validation_rule | Optional. Indicates any constraints that apply to the operation as a whole. |
| instance_mapping_flag | Optional. Value "yes" indicates that this operation's output arguments are to be mapped to Surrogate Object Instance structures 242. |

The execution_parameter may be in any format understandable and meaningful to the Operation Connection Manager 104, 118, 130 or 132 and/or other communications-related components which are executed by the Operation Connection Manager 104, 118, 130 or 132 as part of the process of invoking the operation. The Operation Connection Manager 104, 118, 130 or 132 may translate or transform this information using some directory service or use some other means of determining or acquiring necessary location information so that the operation can be executed.

Operation Type Record

The operation type record 312 defines the type of an executable operation. The operation type record 312 is also used to hold information applicable to a number of operations of the same type.

An operation type record 312 always groups one or more executable operations.

| Property | Description |
| --- | --- |
| name | Meaningful name of the operation type. Identifier - unique within the Catalog database 164. |
| OCM_name | The name of the Operation Connection Manager 104, 118, 130 or 132 to be used by the Surrogate Object Manager 94 for operations of this type. |

Entity Type Record

The entity type record 276 is a meaningful collection of predicates stored in the predicate record 282. The entity type represented by the entity type record 276 normally represents an important thing in the business.

An entity type record 276 always includes one or more sequenced predicate records 282.

An entity type record 276 is sometimes identified by one or more sequenced predicate records 282. This relationship must exist if Surrogate Object Instance structures 242 are to be supported for the Surrogate Object Type structure 244, in which case this relationship is required only for the core entity type record 276 of the surrogate object type record 314, described in more detail hereinbelow. The identifying predicate records 282 are used to identify Surrogate Object Instance structures 242.

An entity type 276 is sometimes the core of only one surrogate object type record 314. If Surrogate Object Instance structure 242 support is enabled, only one entity type 276 is defined as the core entity type 278. Predicates 282 of non-core entity types 276 can also be represented by arguments 288 of included operations 304.

An entity type 276 is sometimes represented in one or more argument groups 296. Surrogate Object Instance structure 242 support requires the ability to identify a group of an operation's output arguments as being a view of an instance of an entity type 276. Values from these arguments 288 are then used to populate predicate values 260 in a Surrogate Object Instance structure 242.

| Property | Description |
| --- | --- |
| name | Meaningful name. Identifier - unique within the Catalog database 164 |
| source_name | Optional. A name used in the original source. May be used by Operation Enrollment Modules 104, 118, 130 or 132 to assist matching in cases of re-enrollment. |
| description | A business-level description of the entity type. |

Predicate

A predicate 282 is an important business fact which describes an entity type 276. A predicate 282 may be an attribute of the entity type 276 or it may be part of a relationship with another entity type 276. For example, "name" might be an attribute of the "customer" entity type 276.

A predicate 282 always describes only one entity type 276.

A predicate 282 sometimes identifies an entity type 282. The identifier of an entity type 276 may include more than one predicate 282.

A predicate 282 is always represented by one or more arguments 288. A predicate 282 also defines the underlying business meaning implied by an argument 288. Association with the arguments 288 of multiple operations 304 enables the indication of common meaning among the arguments 288.

A predicate 282 sometimes defines one or more predicate values 260. Not all Surrogate Object Type structures 244 need be used as the basis of Surrogate Object Instance structures 242. And for those that are, not all predicates 282 of the included entity types 276 need be stored as predicate values 260.

| Property | Description |
| --- | --- |
| name | A meaningful name for the predicate 282. Unique within its entity type 276. |
| source_name | Optional. A name used in the original source. May be used by Operation Enrollment Modules 104, 118, 130 or 132 to assist matching in cases of re-enrollment. |
| description | A business-level description of the predicate 282. |

| Property | Description |
| --- | --- |
| format | For attributes only. Indicates the format used, will include size and data type. |
| optionality | Indicates if every instance of the entity type 276 will have a value for this predicate 282 - includes any required optionality rules. |
| cardinality | Indicates any cardinality constraints on occurrences of the predicate 282, e.g. min., max., average, and indicates any cardinality rules. |
| validation_rule | Optional. Indicates any constraints on values that may be held by the predicate 282. This rule applies to the predicate 282 in general. Additional rules may occur on arguments 288 which are representations of the predicate 282, which will apply prior to execution of an operation 304. |

Argument

An argument 288 is a data item which is either input to or output from an operation 304.

An argument 288 is sometimes a representation of one predicate 282. Where an argument 288 is not associated with a predicate 282, then it is assumed to be an operation-specific variable with no meaning beyond its use by the operation 312.

An argument is always part of one argument group 296. The arguments 288 of a specific operation 312 may be arranged into a hierarchical structure of argument groups 296. At a minimum, each argument 288 will be associated with a highest-level argument group 296 which directly or indirectly includes all the input or all the output arguments 288 of an operation 304.

| Property | Description |
| --- | --- |
| name | Meaningful name for the argument 288. Unique within argument group 296. |
| source_name | Optional. A name used in the original source. May be used by Operation Enrollment Modules 104, 118, 130 or 132 to assist matching in cases of re-enrollment. |
| description | Provides a high-level description of the argument's purpose. |
| format | Indicates the argument's format, will include size and data type. |
| optionality | Indicates if the argument is required by every execution of the operation, may include any required optionality rules to indicate under what conditions this argument is required. |
| cardinality | Indicates any cardinality constraints on occurrences of the argument, e.g. min., max., average, indicates any cardinality rules. |
| mapping_rule | Optional. Only used if the argument is a representation of a predicate, and indicates any format and value translation to occur when mapping a value between the predicate and argument format. |
| validation_rule | Optional. Indicates any constraints on values that may be held by the argument. If the argument is associated with a predicate, then this rule will override any validation_rule defined for the predicate. |

Argument Group

An argument group 296 is a meaningful collection of either input or output arguments 288 of a single operation 304 and is used to indicate structure within the arguments 288 of an operation 304. An argument group 296 is also used to distinguish arguments 288 which are representations of predicates 282 of different instances of the same entity type 276. An argument group 296 is further used to indicate where a group of arguments occurs multiple times in the input or output of an operation 304.

An argument group 296 is sometimes output from only one operation 304.

An argument group 296 is sometimes input to only one operation 304.

An argument group 296 is sometimes part of only one other argument group 296.

These three relationships are mutually exclusive. Argument groups 296 are further used to define hierarchical structure among the data items input to or output from an operation 304. At the top of the hierarchical structure, the topmost argument group 296 is associated with the operation 304 either as input 302 or output 300. Individual arguments 288 form the leaf-nodes of the hierarchical structure.

An argument group 296 sometimes includes one or more sequenced argument groups 296 which is an inverse of the relationship indicated hereinabove.

An argument group 296 may also include one or more sequenced arguments 288 and must include either another argument group 296 or arguments 288.

| Property | Description |
| --- | --- |
| name | Meaningful name for the argument group 296. Unique within argument group 296 or operation 304. |
| source_name | Optional. A name used in the original source. May be used by the Operation Enrollment Modules 104, 118, 130 or 132 to assist matching in cases of re-enrollment. |
| description | Provides a high-level description of the argument group's 296 purpose. |

Predicate Instance Mapping

A predicate instance mapping 266 is only required if Surrogate Object Instances 248 are to be enabled for the Surrogate Object Type structure 244. A predicate instance mapping 266 defines an intersection between an argument 288, a predicate 282 and the surrogate object type record 314.

A predicate instance mapping 266 always defines the source of a predicate 282 in an instance of one Surrogate Object Type structure 244.

A predicate instance mapping 266 always maps to one argument 288.

A predicate instance mapping 266 always maps to one predicate 282.

For an output argument 288, the existence of an associated predicate instance mapping 266 indicates that argument values defined by this argument 288 are mapped to the corresponding predicate value 260 in the Surrogate Object Instance structure 242. If there are no predicate instance mapping objects 266 for a predicate 282, no corresponding predicate values 260 will exist in any Surrogate Object Instance structure 242.

For an input argument 288, the existence of an associated predicate instance mapping 266 indicates that the corresponding argument value is mapped from the corresponding predicate value 260 in a Surrogate Object Instance structure 244 prior to operation execution. For predicates 282 other than identifying predicates 282 this can be overridden by a value provided by the Operation Requester 92.

For both input and output arguments 288, transformation between the format of the predicate 282 and the format of the argument 288 is defined by the mapping_rule defined on the argument 288. Predicate values 262 stored in the Surrogate Object Instance structure 242 are held in the format defined by the predicate 282.

To support instance mapping, an operation's arguments 288 must include arguments 288 which are representations of all of the set of predicates 282 which form the identifier of the core entity type 276 of the Surrogate Object Type structure 244.

No properties are required. The predicate instance mapping 266 is identified by the combination of its relationships with argument 288, predicate 282 and surrogate object type record 314.

Operation Activation Structure

An Operation Activation structure 246 is a collection of records that together represents an occurrence of the activation (invocation) of an operation 304 defined within a Surrogate Object Type structure 244. The Operation Activation structure 246 provides a "staging area", which enables the input and output arguments 288 to be assembled into an operation-neutral format prior to the operation 304 being invoked and after execution.

The Operation Activation structure 246 is implemented so that the relationships between the operation and operation activation records can be traversed in either direction.; i.e., it must be possible to determine all the operation activations for a given operation, and from a given operation activation, determine what operation it is for. Each individual Operation Activation structure 246 based on a single root operation activation record can be saved to the Operation Activation Storage file 100 as an option. This permits a form of operation activation logging. However, the preferred implementation does not require this persistence as an Operation Activation structure 246 is normally only required by an Operation Requester 92 for the duration of an operation activation "cycle", during which time the Operation Activation structure 246 is maintained in computer memory.

After operation execution, output arguments are either retrieved immediately by the Operation Requester 92 and/or they are mapped to predicate values 260 in a Surrogate Object Instance structure 242 which can then be saved to the Surrogate Object Instance Storage file 98. Once the Surrogate Object Manager 94 processing is terminated, all unsaved Operation Activation structures 246 are lost.

Operation Activation Data Model

Operation Activation Record

An operation activation record 316 is the root of an Operation Activation structure 246 and holds details of a single invocation—or activation—of an operation 304, including time of activation, user-id of person requesting activation, execution status, error message etc. When written thus, "Operation Activation" the term refers to the structure; when written thus, "operation activation", the term refers to the root record type within such a structure.

An operation activation record 316 always records the invocation of only one operation 304.

An operation activation record 316 sometimes has as input one or more argument value groups 324.

An operation activation record 316 sometimes has as output one or more argument value groups 324.

| Property | Description |
| --- | --- |
| activation_ID | Date and time of the activation. Unique within operation. |
| activation_status | Gives execution details and provides a means to check the current execution status. Values include: "in preparation"; the activation object has been created but the operation should not be invoked yet "in progress"- the execution has been requested but no response or error has yet been encountered "completed OK"- operation execution was successful and a valid response has been received |

| Property | Description |
| --- | --- |
| | "application error"- operation execution was successful but an application-level error has occurred "system error"- some error has occurred which has prevented a response from the operation being received. |
| activation_message | Optional. Provides additional information regarding the activation_status. The message may be returned from the operation or generated by the system if an error has occurred |
| instance_mapping_status | Optional: Indicates if Operation Activation results were successfully mapped to Surrogate Object Instance records. Only required if instance mapping is being used. |
| user_information | Optional. Could be used to record the system identifier (user-id) or other user-related properties of the person requesting the Operation Activation. |
| callback_pointer | Optional. Points to a user-provided module to be executed by the Operation Connection Module 104, 118, 130 or 132 on completion or error. |

An Operation Activation structure 246 is identified by a combination of its associated operation and the activation_ID.

Argument Value

An argument value 328 holds the value for an argument for a specific operation activation 316. In the preferred embodiment of the present invention, each argument value 328 is implemented as a slot in a record which includes either all the input or output argument values, arranged according to the sequence and structure defined by the argument value groups 324. The relative position of each argument value 326 within the record corresponds to the relative position of the defining argument within the operation input or output argument structure. An argument value 326 is always part of one argument value group 324.

| Property | Description |
| --- | --- |
| <value> | The stored value. |

Surrogate Object Instance Structure

The Surrogate Object Instance structure 242 provides a form of local "database" comprising a collection of records which hold data representing one or more instances of a common surrogate object type record 314. The Surrogate Object Manager 94 functions which offer access to these records in the Surrogate Object Instance structure 242 act as the database engine.

A Surrogate Object Instance structure 242 comprises possibly multiple "root" surrogate object instance records, together with one or more entity records each with one or more predicate value slots. Each entity and predicate value is created from the output of one or more operations after their execution. Individual arguments are mapped to predicate value slots based on the predicate instance mappings defined in the Surrogate Object Type structure 244.

The exact structure of the records included within a Surrogate Object Instance structure 242 will depend upon a combination of the definition of the Surrogate Object Type structure 244, which operations have been invoked and with what input arguments, the state of the data currently held on the application databases accessed by the operations and the rules included within the operation logic.

Where repeated executions of the same operation, or executions of different operations results in output arguments being returned that represent the same predicates of the same entities (i.e. the values of the output arguments which represent the identifying predicates of the entity type are the same) this will cause the same predicate value slots of the entity record to be used and the values and properties stored therein will be updated.

Surrogate Object Instance Data Model

Surrogate Object Instance (SOI) record

The Surrogate Object Instance record type 248 represents the root object of the Surrogate Object Instance structure 242 and collects together the set of predicate values which together hold the instance data. When written thus, "Surrogate Object Instance" the term refers to the structure; when written thus, "surrogate object instance", the term refers to the root record type within such a structure.

| Property | Description |
| --- | --- |
| identifier | Unique identifier for the SOI record type 248 within Surrogate Object Type structure 244. |

Entity

The entity 254 represents an occurrence of an entity type 276. The entity 254 collects together the predicate values 260 that hold the data stored about the entity 254. An entity 254 is identified by the values in the predicate slots that correspond to the predicates that form the identifier of the entity type 276. Each of these slots must hold a valid value.

An entity 254 sometimes is the core of a Surrogate Object Instance structure 242.

An entity 254 always includes one or more predicate values 260.

An entity 254 is always is defined by one entity type 276.

| Property | Description |
| --- | --- |
| last_updated_operation | name of operation which caused creation or last update of a predicate value slot. |
| last_updated_time | activation_ID (timestamp) of operation activation resulting in creation or last update of a predicate value slot. Provides traceability - finer detail carried on each predicate slot. |

Predicate Value

A predicate value 260 holds the value of an individual predicate 282 within an entity 254. In the preferred embodiment of the present invention, each predicate value 260 is a slot in an entity record. Each predicate 282 in the set defines the corresponding predicate value 260.

A predicate value 260 always is included in one sequenced entity 254.

A predicate value 260 is sometimes paired with one predicate value 260.

If the corresponding predicate 282 in the entity type 276 represents a relationship, the predicate value 260 is paired with a predicate value 260 belonging to an entity 254 of the related entity type 276. This provides a navigable pointer pairing mechanism allowing relationship pairings between entities 254 to be traced.

A predicate value 260 is always defined by one predicate 282.

| Property | Description |
| --- | --- |
| \<value\> | The stored value. |
| last_updated_operation | name of operation which caused last update of the value in this slot. Provides traceability. |
| last_updated_time | activation_ID (timestamp) of operation activation resulting in creation or last update of this slot. Provides traceability. |

Operation Connection Manager

The Operation Connection Manager 104, 118, 130 or 132 provides a generalized runtime connection capability enabling the Surrogate Object Manager 96 to trigger execution of an implemented operation. An Operation Connection Manager 104, 118, 130 or 132 will be required for each set of operations which support a consistent interface protocol. Operations built by a common tool in a common style may all be able to use the same Operation Connection Manager 104, 118, 130 or 132. For example, any distributed process server (DPS) module built with Composer by IEF, for example, regardless of the platform on which the DPS module executes, can be accessed by the same Composer Operation Connection Manager 104. Similar use of a common Operation Connection Manager 130 or 132 is likely to be possible for operations built by other application development tools.

The Surrogate Object Manager 94 and the appropriate Operation Connection Manager 104, 118, 130 or 132 will collaborate to ensure the input arguments in the Operation Activation object 316 are formatted and defined in the manner expected by the operation, and communicated to the operation using the appropriate communication protocol. The Operation Connection Manager 104, 118, 130 or 132 is responsible for applying input and output transformation rules to transform data between the format stored in the Operation Activation structure 246 and the operation message format and back again.

Depending on the requirements of the type of operation involved, the Operation Connection Managers 104, 118, 130 or 132 can be written to accommodate operations which expect fixed or variable length message structures, in a pre-defined sequence or with embedded tags describing the arguments. Data compression or encryption algorithms can also be incorporated as required on both input and output. The input and output transformation rules and data marshaling rules can be coded as part of the Operation Connection Manager 104, 118, 130 or 132, or can be retrieved from some external source to be evaluated at execution time.

The Operation Connection Manager 104, 118, 130 or 132 is responsible for monitoring operation progress including operation completion and the detection of various possible error conditions. In the case of successful completion, the Operation Connection Manager 104, 118, 130 or 132 decodes the returned data into the set of output argument values in the Operation Activation structure 246.

Through the definition of a set of common functions that must be supported by all of the Operation Connection Managers 104, 118, 130 or 132, the present invention provides for any number of different Operation Connection Managers 104, 118, 130 or 132 to be used simultaneously by the Surrogate Object Manager 94. Differences between operation types are thus made transparent to the Operation Requester 92.

It is anticipated that the Operation Connection Managers 104, 118, 130 or 132 are built in advance by a user of the present invention in accordance with the specific operation types, or developed and sold by application development tool vendors as part of their commercial offerings.

Flow

Overview

A general description of the use and behavior of one embodiment of the primary components of the present invention is described hereinbelow. This description follows a logical sequence, describing three phases of use. In the first phase, operations are created and their definitions are enrolled into the Catalog database 64. In the second phase, these operations definitions are combined to create a Surrogate Object Type and Operation Requester 92 and any user interface or other programs are also constructed. In the final phase, the completed application is used and operations are executed with input data being passed from the Operation Requester 92 to the operation via the Surrogate Object Manager 94 and the appropriate Operation Connection Manager 104, 118, 130 or 132. The results of the execution are then returned to the Operation Requester 92.

Scenarios

Two slightly different scenarios are described to illustrate the purpose and flow of information through the various elements of the present invention. Both scenarios involve the use of a common set of operations (described hereinbelow). In this example, the operations implement behavior of a "customer" business object, and their definitions are used to create a "Customer" Surrogate Object Type. To the developer of a user interface program, the Customer Surrogate Object Type behaves as if it includes the implementation of the operations—it has become a surrogate for the set of customer operations.

Figure 5:
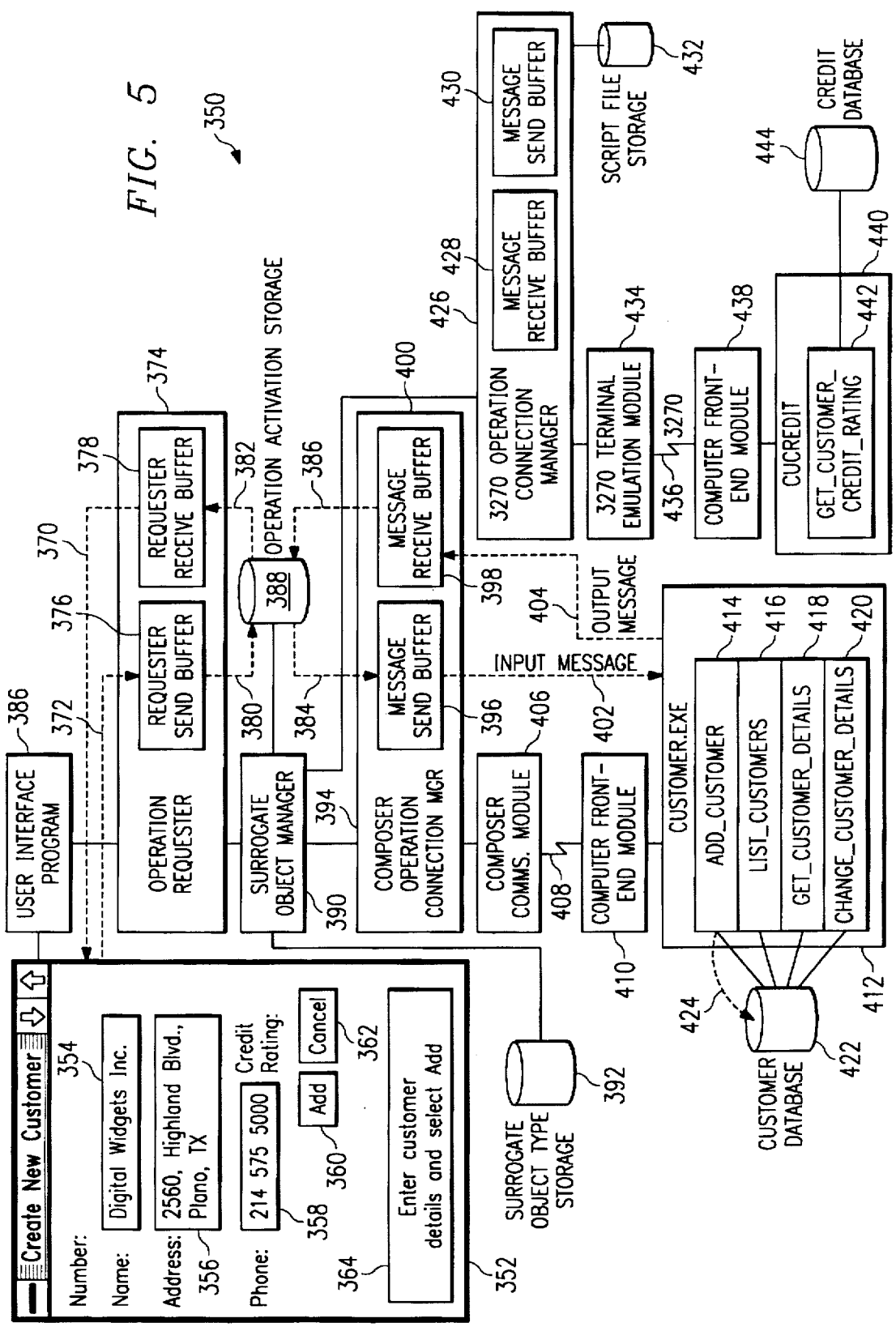
FIGS. 5, 6 and 7 are block diagrams of one embodiment of the present invention illustrating the flow of information at runtime through the elements of one embodiment of the present invention.
Figure 6:
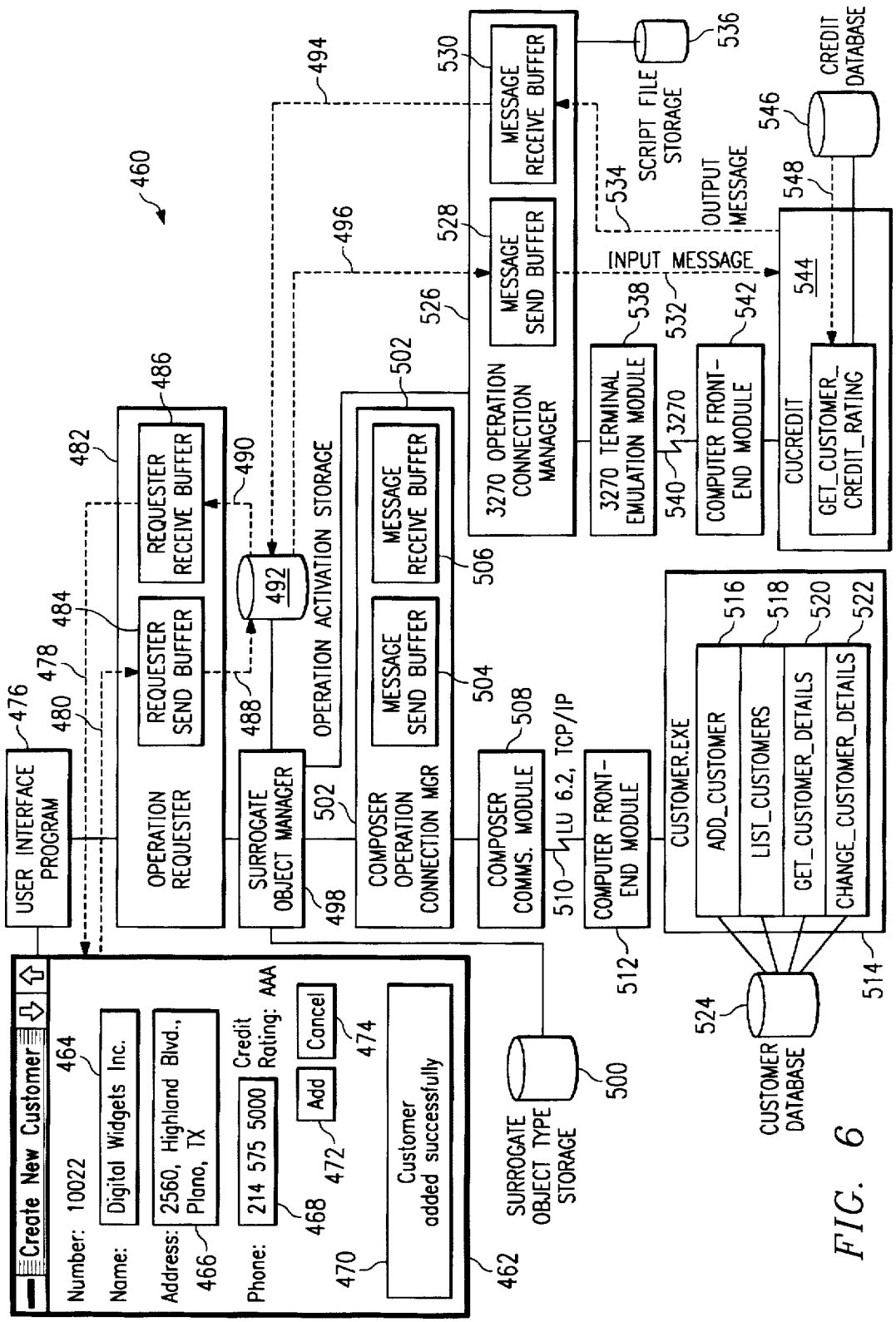
Figure 7:
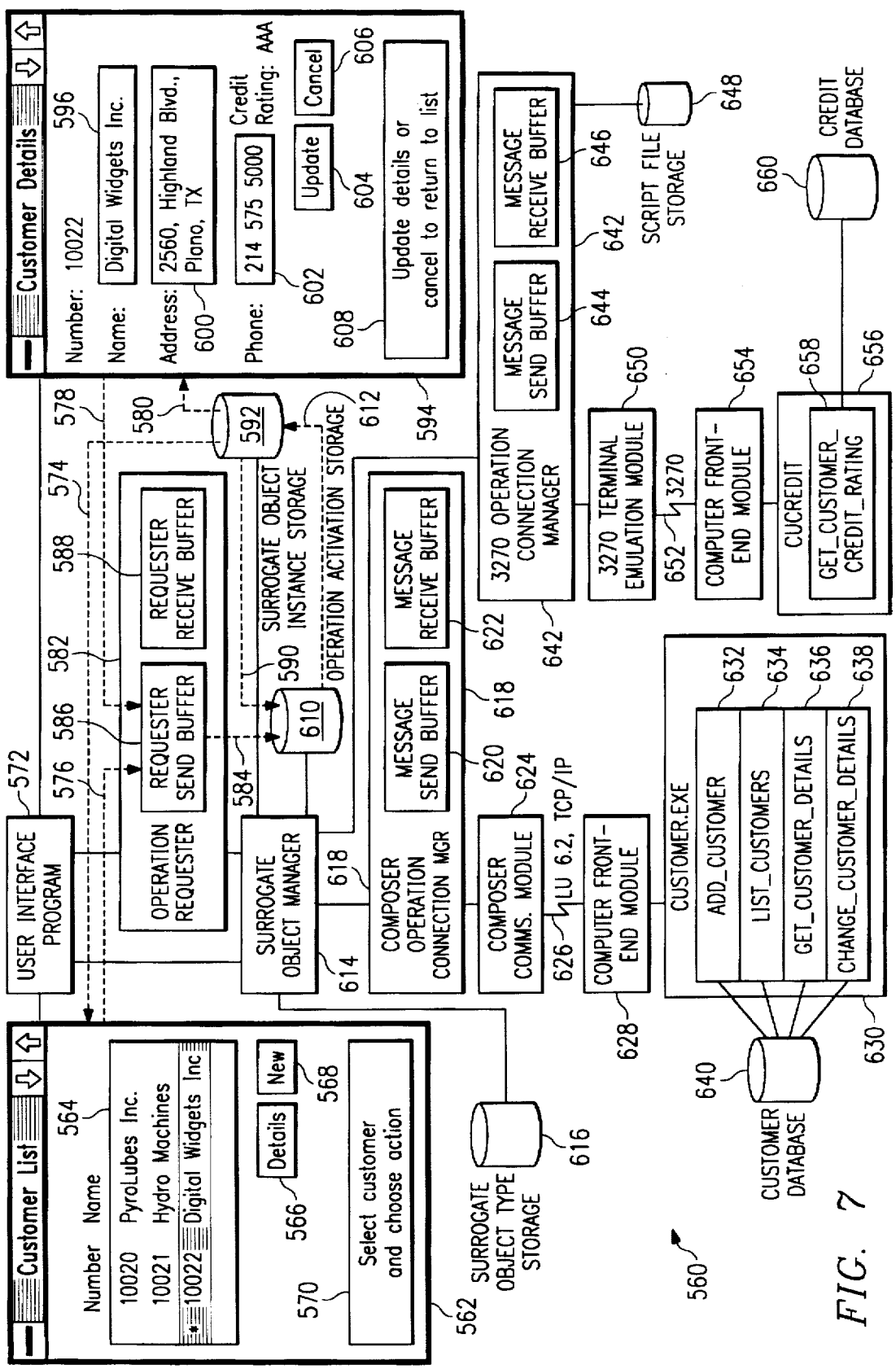

Scenario 1, illustrated in FIGS. 5 and 6, show the simplest use of the present invention with a user interface program 368 which provides any required transient or persistent management of the data returned by the operations. Scenario 2, illustrated in FIG. 7, is an extension of scenario 1 and illustrates in more detail the use of the Surrogate Object Instance feature of the present invention. In the second scenario, the user interface program 572 makes use of the facilities provided by the system to manage instance data returned by the operations. Furthermore, in scenario 2, the Surrogate Object Manager 614 functions are used to create and manage discrete surrogate object instances, one per customer record that has been accessed by an operation. Each surrogate object instance is accessible individually and can be made the subject of operation requests.

Building The Operations

Both scenarios described hereinbelow involve the same set of exemplary executable operations: Add_Customer, List_Customers, Get_Customer_Details, Change Customer Details and Get_Customer_Credit_Rating. Each of the operations are stored on one of a plurality of heterogeneous, distributed computers interconnected by an exemplary computer network system 20 as shown in FIG. 1. The input and output arguments for each exemplary operation are described in FIG. 8.

With the exception of Get_Customer_Credit_Rating, each of the exemplary operations involves either creating, reading or updating of customer records stored in a shared customer database 424, 524 or 640. These four operations behave as follows:

Add_Customer creates a customer record in an application database with values for name, address and phone number as supplied in the operation input arguments and returns in addition the unique customer number created to identify the new customer record.

List_Customers returns a list of the customer number and name stored on each customer record in the database.

Get_Customer_Details requires a customer number. If a matching customer record is found in the database, the operation returns the name, address and telephone number stored therein.

Change_Customer_Details requires the customer number and optionally, the name, address and telephone number. If the customer is found, then the supplied values for name, address and telephone number will be used to replace those in the database.

These four exemplary operations have been packaged together into a single executable—the Customer operation package, "CUSTOMER.EXE" 412, 514 or 630. Execution of the correct exemplary operation within this package requires the use of an execution_parameter passed to the operation package 412, 514 or 630—in these scenarios, this takes the form of a command field. The command values required for each operation are described in FIG. 8 as the execution_parameter.

Regarding the first scenario as illustrated in FIG. 7, the four operations, Add_Customer, List_Customers, Get_Customer_Details, and Change_Customer_Details have been developed using a common tool, i.e., Composer by IEF, so they share a common protocol for execution and argument passing. As a consequence, all these operations can be connected to the Surrogate Object Manager 390 via a single, common Operation Connection Manager, shown in FIG. 7 as the Composer Operation Connection Manager 394. The Composer Operation Connection Manager 394 in turn uses the Composer Communications Module 406 to communicate with the computer system on which the operation package 412 is implemented via the computer front-end module 410 associated with that computer system. The computer front-end module 410 assists in routing the operation request to the operation and the response back.

The operation Get_Customer_Credit_Rating is implemented on a different computer system, is developed in a different language with a different tool, uses a different database and runs under a different operating system. (In this scenario, this operation is, for example, part of an older information system which would otherwise be difficult to integrate with the newer operations in the Customer operation package 412 at runtime.) By making Get_Customer_Credit_Rating available as an operation of the Customer Surrogate Object Type, the present invention makes it appear indistinguishable from the other newly-built operations to the person developing the Operation Requester 378.

In both scenario 1 and scenario 2, the operation Get_Customer_Credit_Rating is accessed using the 3270 message protocol through the 3270 Terminal Emulation Module 434 and the Computer Front-End Module 438. This communication protocol is a de facto standard for screen-based communication between IBM-compatible computers and "dumb terminals".

The 3270 protocol defines how information to be displayed on a screen is packaged into a data stream. The data stream includes the data to be displayed together with various control codes which are interpreted by the display terminal. Interception of this data stream at the terminal end by the terminal emulation software running on some other kind of computing device (i.e. a personal or server computer as opposed to a "dumb terminal") enables this data stream standard to be used to communicate with compatible operations implemented on IBM-compatible mainframes. This is particularly suitable if it is desired to make use of application components already in existence which were written initially to use this communication protocol.

Thus, the present invention provides the ability to incorporate older, pre-existing communication technology and thus integrate access to a wide range of existing applications as well as applications specifically designed to exploit the present invention. Other standard messaging protocols could similarly be used whether screen oriented or not.

Figure 9:
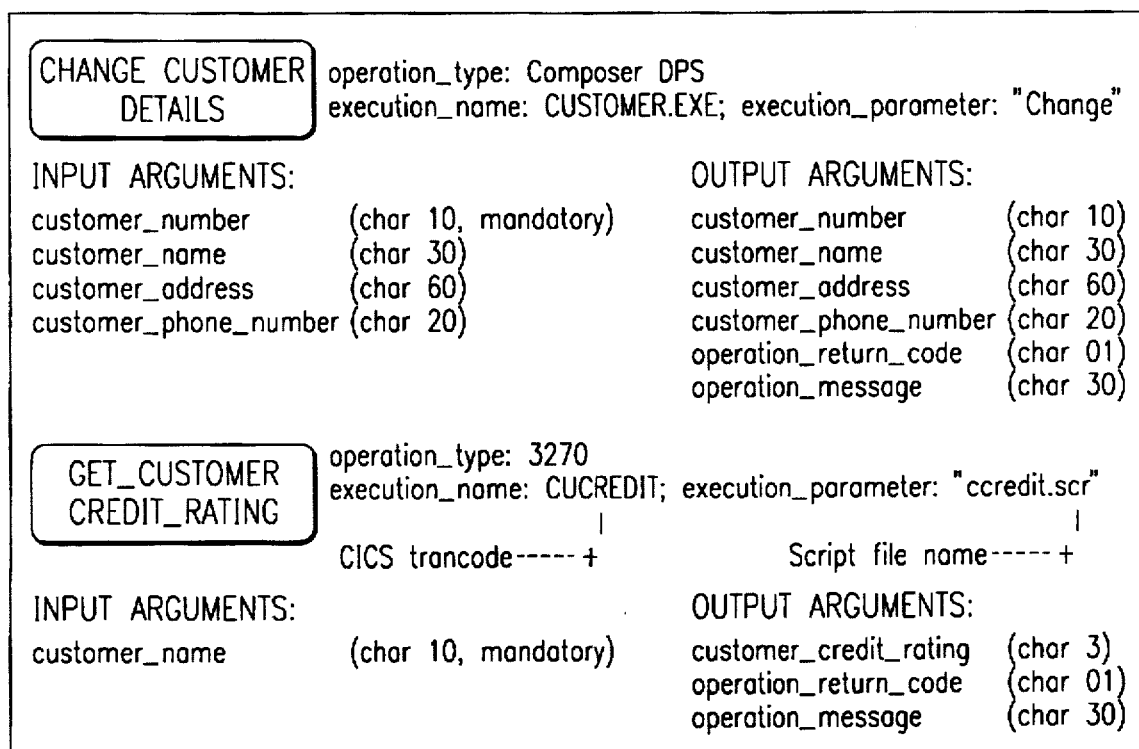

In the scenarios described herein in FIGS. 7-9, a specialized 3270 Operation Connection Manager 426, 528 or 642 is shown. The specialized 3270 Operation Connection Manager 426, 528 or 642 is responsible for mapping operation input arguments into a 3270 data stream and sending it to the host for processing, and then for receiving the 3270 data stream sent back in response and for identifying the output arguments within the 3270 data stream and mapping these output arguments back into the form understood by the present invention.

Although the 3270 data stream is pre-determined, the layout of information on each screen frequently varies from screen to screen—i.e. the row/column starting position and length of fields and text strings. As this layout information affects the relative position of data and other elements within the 3270 data stream, this information is required to enable the 3270 Operation Connection Manager 426, 528 or 642 to map the operation arguments into and out of the data stream. In addition, other control codes may need to be entered into the data stream, or multiple interactions between the 3270 Operation Connection Manager 426, 528 or 642 and the host may be required to cause the host system to be put in a state ready to execute the operation. This information is likely to include user log-on and access, via menus and other control mechanisms, to the correct "screen" on which the operation data is represented.

This navigation and formatting information will normally be different for each operation, although re-usable for every execution of the same operation. This "script" information could be written into the logic of the 3270 Operation Connection Manager 426, 528 or 642 or stored externally in Script File Storage 432, 536 or 648 as a set of parameters which are accessed and interpreted whenever the operation is to be executed.

In both scenario 1 and scenario 2, script information is required to enable the 3270 Connection Module 426, 528 or 642 to correctly locate and execute the Get_Customer_Credit_Rating operation 442. External storage of this is assumed and illustrated in FIGS. 5, 6 and 7 in the Script File Storage 432, 536 or 648, respectively.

Select Or Build The Required Operation Connection Managers

The Operation Connection Manager 426, 528 or 642 is expected to be a common module used to connect many operations with similar connectivity characteristics into the system. If a new type of operation is being used for the first time a new Operation Connection Manager may have to be constructed, otherwise one should already exist.

Figure 13A:
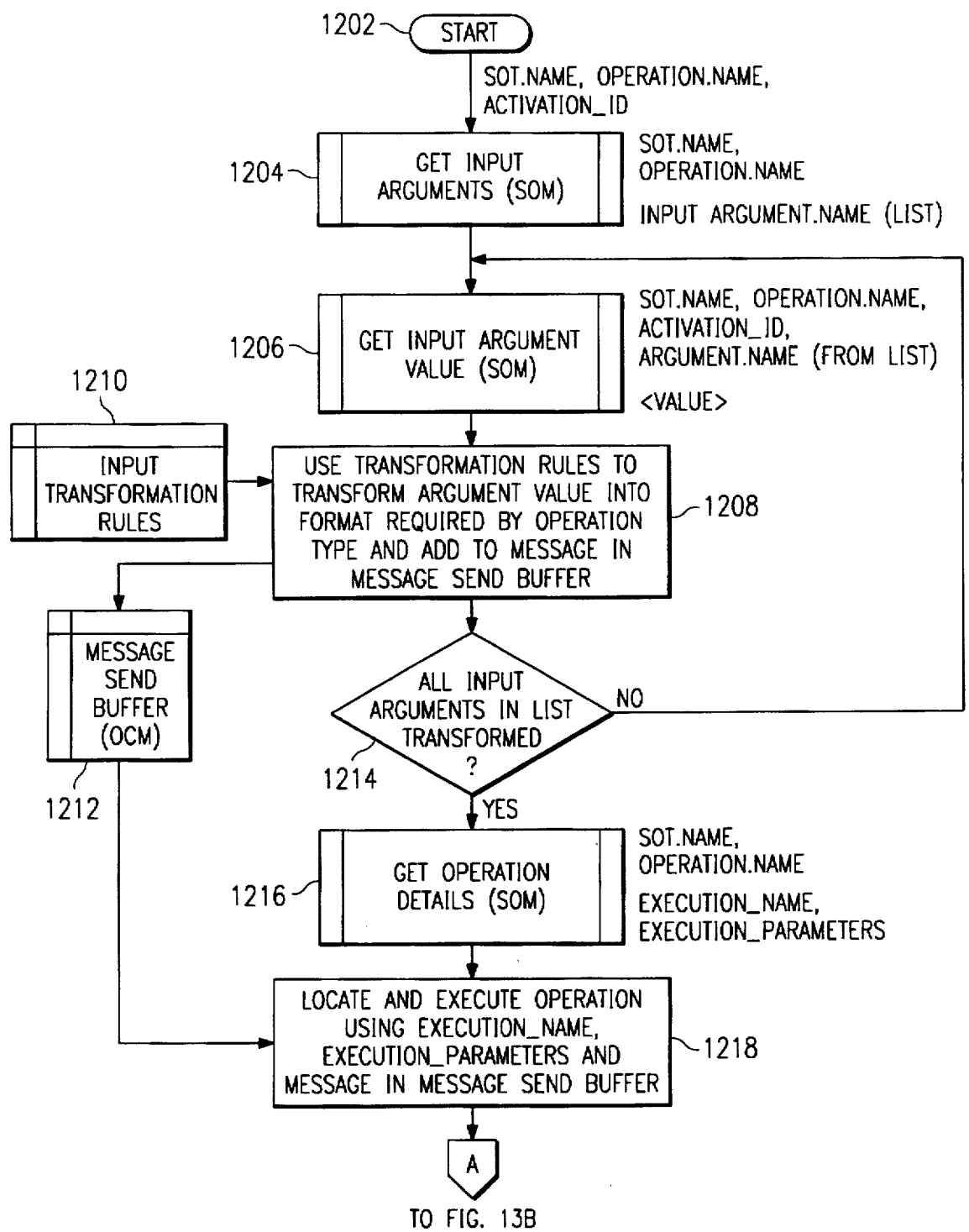
FIGS. 13A-C is a logic flowchart of an exemplary Execute Operation function of the Operation Connection Manager in one embodiment of the present invention.
Figure 13B:
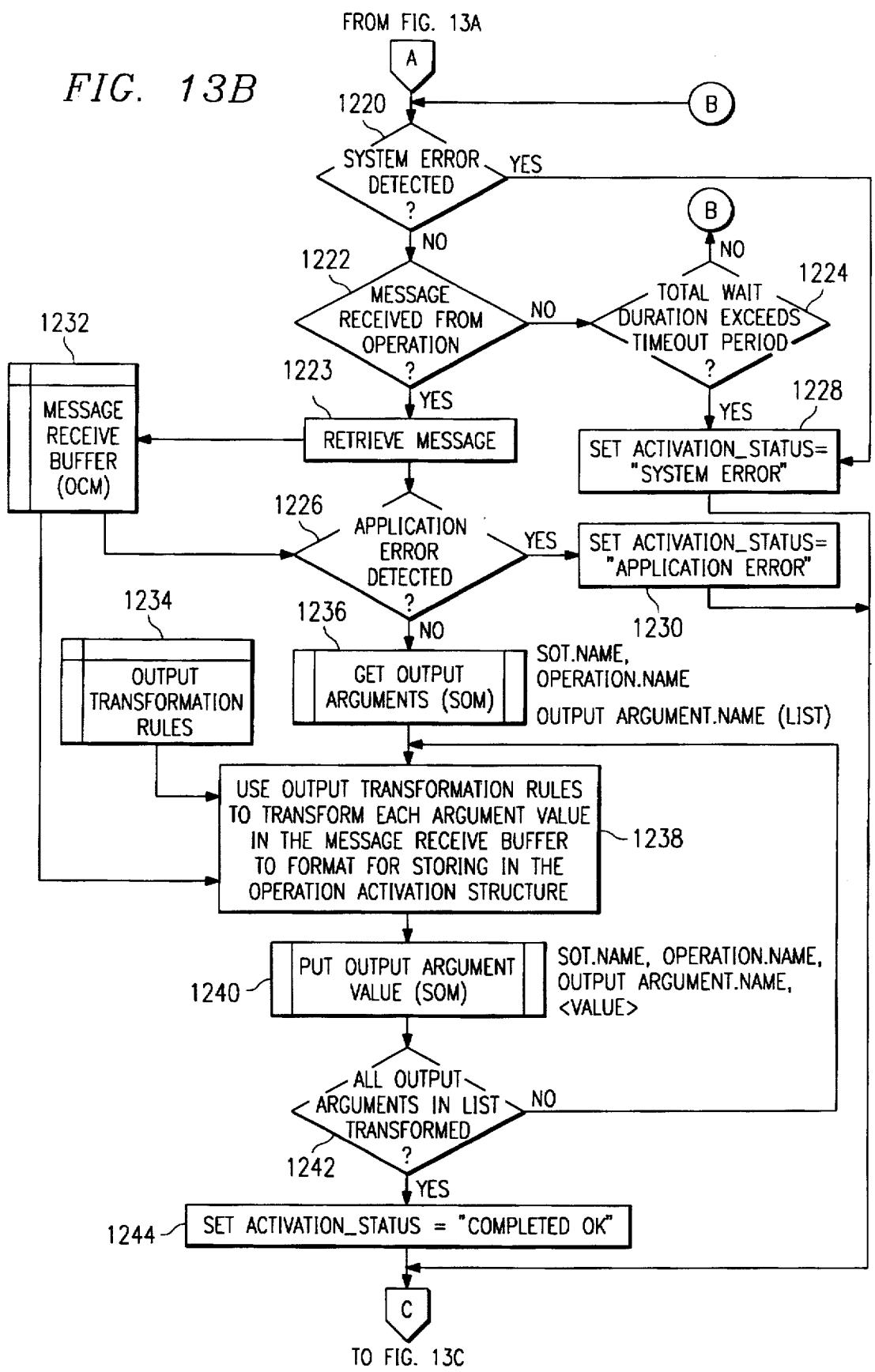
Figure 13C:
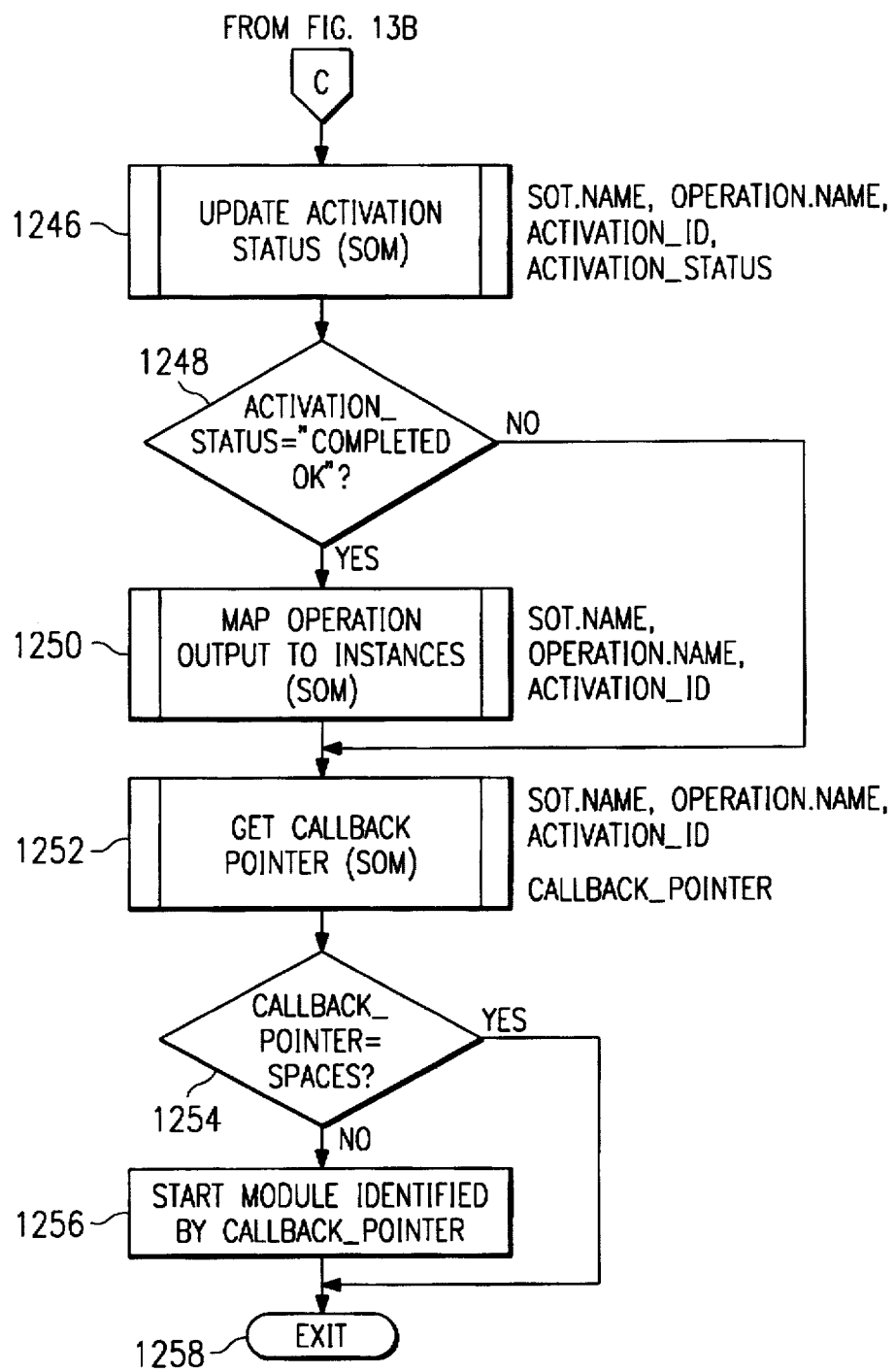

The operation of the Operation Connection Manager 426, 528 or 642 is illustrated in the flowchart shown in FIG. 13. The present invention allows the simultaneous use of multiple, different Operation Connection Managers. It must be possible for any Surrogate Object Manager that has to access an operation to be able to locate the Operation Connection Manager for that type of operation. It may be that the Operation Connection Managers will be co-located with the Surrogate Object Managers, perhaps on a user's desktop machine, or they may be located on a shared computing resource and re-used by multiple Surrogate Object Managers. Both scenarios 1 and 2 require a Composer Communications Module 406, 508, or 624 and a 3270 Terminal Emulation Module 434, 538 or 650 to be present.

Enroll the Operations and their Arguments into the Catalog

Information representing an operation and its input and output arguments must be stored in the Catalog database 64 before it is accessible through the present invention. If the Catalog database 64 being used for the present invention is shared with the development tools used to develop the operation code, then this information may be present as a result of the normal development process. If the operation has been developed from a separate development repository then this information may be enrolled using an Operation Enrollment Module 160.

Operations which have been manually written or built using a tool for which a specific Operation Definition Module 82 is not available can be input manually using an Operation Enrollment Module 160 that supports manual entry.

Once entered in the Catalog database 64, regardless of the source, information can be maintained by the Catalog Editor 148.

In the two scenarios discussed here, the operations are either built with Composer or they are existing 3270-based operations. In both cases, information about the operations has been stored in Composer's development repository and is extracted and enrolled into the system's Catalog database 64 using an Operation Enrollment Module 160 designed for the purpose.

The Operation Enrollment Module 160 captures properties of each operation and associates each operation with an operation type object, and then maps the definition of each operation's input and output arguments from a Composer-proprietary representation to the representation defined in the data model of the Catalog database 64 as illustrated in FIG. 3.

As described hereinabove, a key function of the Operation Enrollment Module 160 is the construction of a normalized model of the underlying set of business facts that are represented by the arguments of operations being enrolled. The model is built up with each successive operation as it is enrolled. The arguments of each operation being added are matched to predicates in the model as it already exists. The arguments are either associated with existing predicates and entity types in the model or if necessary, new ones are added.

For example, if the operation Get_Customer_Details is added after Add_Customer has been added, the arguments of Get_Customer_Details will be found to entirely overlap with those of Add_Customer as illustrated in FIG. 8. In the Catalog database 64, records will be created to represent the new operation and its arguments and these will be associated with the arguments of Add_Customer through their mutual reference to common predicates.

Additionally, mapping and validation rules may be specified. Mapping rules allow a transformation to be described between the format of an argument and the predicate. In this way minor variations in the representation of common concepts can be supported.

If transformation is required between the format defined by the predicate and the format defined by the argument, the mapping_rule property on both input and output argument objects is used to store the rule. This mapping_rule would define format and domain transformations between the predicate and the arguments affecting things such as left or right alignment, character padding, null characters representation, addition or removal of currency symbols, numeric to character conversion and etc. The mapping_rule on the input argument would be applied before operation execution; the mapping_rule on the output argument would be applied after execution.

Validation rules stored in the Catalog database 64 enable arguments to be verified prior to operation execution. Validation rules can be stored in the validation_rule property on a predicate, on an input argument, or on the operation. Validation rule processing is invoked on request by the Operation Requester 92 to validate an operation's input arguments, perhaps as they are entered through the user interface, or immediately before invoking the operation as shown in the operation of the Operation Requester 92 illustrated in the flowchart shown in FIG. 11.

The present invention does not specify a particular rule language for either the validation or mapping rules. Any procedural or declarative rule language can be used and implemented in the design of the Validate Input Argument and Validate Operation Input functions of the Surrogate Object Manager 94. The point at which these functions are invoked is indicated in the flowcharts shown in FIGS. 11–13. It is contemplated that a corresponding rule parser and checker could be usefully included as part of the Operation Enrollment Module 160 to assist in the correct definition of rules upon entry to the Catalog database 64.

The other Catalog record types and their properties described earlier are captured either during enrollment or during maintenance using the Catalog Editor 148. Emphasis is placed on having descriptions in the Catalog database 64 that will assist the developer of an Operation Requester 92 to locate and identify operations which match their needs.

Browse Catalog To Find Suitable Operations And Create A Surrogate Object Type

Both scenarios are based on the creation and use of a Surrogate Object Type created to represent a customer business object. A customer business object requires a collection of operations which act upon customer information. The Surrogate Object Definition Module 96 is used to browse among the operations that have been enrolled into the Catalog database 64 to locate those to be included in the Surrogate Object Type.

It is contemplated that the process of searching the Catalog database 64 for operations which match some set of requirements could be included in the present invention.

If it is ever intended that the Surrogate Object Type might support instance mapping (i.e., the creation of Surrogate Object Instances), then a core entity type must be defined. If this is done, it is likely, but not essential, that the operations to be included will all have arguments which represent predicates of the core entity type. Only those operations whose output arguments include representations of all of the identifying predicates will be able to participate in instance creation.

Once the required operations and the core entity type (if required) have been identified from the Catalog database 64, the Surrogate Object Definition Module 96 calls the function Create_SOT_Structure of the Surrogate Object Manager 94 passing it information about the selected objects. In this case, the Create_SOT_Structure function creates an instance of the Surrogate Object Type structure 244 with a root surrogate object type record with name of "Customer." The Create_SOT_Structure function also populates the structure with records replicated from the Catalog database 64 including the selected operations, their associated operation type(s), their input and output arguments, each argument's associated predicates and the entity types these predicates belong to.

When complete, the Surrogate Object Type structure 244 includes a replicated subset of the information held in the Catalog database 64. The Surrogate Object Type structure 244 includes all the information required to support the execution of the operations defined within it. Further minor modification to the properties of objects included within the Surrogate Object Type structure 244 can be carried out with the Surrogate Object Definition Module 96 without further contact with the Catalog database 64.

Once completed, the Surrogate Object Type structure 244 is saved in a persistent form in the Surrogate Object Type Storage file 100 by invoking the Save_SOT_Structure function of the Surrogate Object Manager 94. Surrogate Object Types can be created in advance of their planned use by the Operation Requester 92 or can be created as and when needed. Once saved in the persistent form, the Surrogate Object Type structures 244 can be distributed to wherever they may be required.

Build the Operation Requester and User Interface Program

The Operation Requester 92 and user interface program 90 are now built. In both scenarios, the Operation Requester 92 is called by the user interface program 90 which enables data to be entered by the end-user, each operation to be executed and any returned data to be viewed. The screen generated by and the behavior of the user interface program 90 provide the means by which the user can activate the operations executable using the present invention and to observe their effect.

In scenario 1, as illustrated in FIG. 5, the user interface program 368 provides any required desktop persistence of data between operation executions. In a simple solution, this is likely to be done using in-memory data structures. In this way data values returned as output arguments of one operation can be re-used as input argument values for a subsequent operation execution without re-entry by the user. Values can be retained in in-memory structures for as long as the user interface program is running but will be lost when it is stopped.

A more complex solution might provide persistence across multiple sessions, storing important data values in some non-volatile storage medium. However, provision of any such capability would be the responsibility of the programmer of the user interface program 368 and is not provided for by the system.

In both scenarios, as illustrated in FIGS. 5–7, revision #3 of the Visual Basic language and product from Microsoft is used to construct the Operation Requester 378, 482 or 582 and the user interface program 368, 476 or 572. Appropriate code is written to trigger operation execution and to map input and output arguments into the Operation Activation structure 246 via the functions offered by the Surrogate Object Manager 390, 498 or 614. This will be accomplished if the developer constructs the logic of the Operation Requester 378, 482 or 582 in accordance with the preferred logic shown in the flowchart illustrated in FIG. 11.

To assist the programmer writing the Operation Requester 378, 482 or 582, the Surrogate Object Type structure 244 is examined using the Surrogate Object Definition Module 96. This enables the programmer to determine the correct operation names and argument names to use in construction the program logic statements required to invoke the required Surrogate Object Manager 390, 498 or 614 functions.

Alternatively, because the Surrogate Object Manager 390, 498 or 614 supports pre-defined functions, it is contemplated that standard application development tools could be built to automatically generate some or all of the code of the Operation Requester 378, 482 or 582 based on the contents of the Surrogate Object Type structure 244.

Once developed, the Operation Requester 378, 482 or 582 and the user interface programs 368, 476 or 572 are deployed onto the intended computing platform ready for use. In these scenarios, this could be a desktop personal computer running the Microsoft Windows operating system.

All of the other elements of the present invention required at runtime must also be installed and readied for use. This includes the Surrogate Object Manager 390, 498 or 614, the saved Customer Surrogate Object Type structure 244 in the Surrogate Object Type Storage file 392, 500 or 616, the Composer Operation Connection Manager 394, 502 or 618, the 3270 Operation Connection Manager 426, 526 or 642, the 3270 script file 432, 536 or 648 for the Get_Customer_Credit_Rating operation, and the operations and the databases they access.

Executing Operations at Runtime; Scenario 1

The diagrams shown in FIGS. 5 and 6 show data flows through specific elements of the present invention and depict the appearance of the user interface and data content of the databases before and after use of the present invention. The operation of the Operation Requester 378 or 482, illustrated in the flowchart shown in FIG. 11; the operation of the Start_Operation_Execution function of the Surrogate Object Manager 390 or 498, illustrated in the flowchart shown in FIG. 12; and the operation of the Execute_Operation function of the Operation Connection Manager 394, 426, 502 or 526, illustrated in the flowchart shown in FIG. 13, further illustrate certain aspects of the data flow of one embodiment of the present invention.

In Scenario 1, as illustrated in FIG. 5, the user interacts with the present invention entirely through an application window 352 presented by the user interface program 368. The application window 352 permits the user to enter new customer details and request that a new customer record is created. This causes the Operation Requester 378 to be called which in turn calls the Surrogate Object Manager 390 which invokes the Add_Customer operation. This request is passed on via the appropriate Operation Connection Manager 394 or 426 and the operation is executed.

This operation creates a new customer record in the customer database, using the details entered by the user and assigns the record a new identifying customer number. When the user interface program 368 receives confirmation through the present invention that the operation executed successfully, it calls the Operation Requester 378 again, this time to invoke the Get_Customer_Credit_Rating operation, which searches the credit database 444 for the customer by name and returns the customer's credit rating if found.

FIG. 6 shows one embodiment of the present invention in accordance with the scenario illustrated in FIG. 5 immediately after the user has entered the customer details but before requesting that the record is added.

FIG. 7 shows another embodiment of the execution of the present invention in accordance with a second scenario after successful completion of the addition and the credit rating search.

Details of the flow through each of the elements of the present invention are described hereinbelow. The logic of the user interface program 368, 476 or 572 is not described as this can vary widely depending upon design choices of the developer.

Adding A New Customer

The user first starts the user interface program 368 from the Windows program manager. The user interface program 368 displays the Create New Customer application window 352 and then waits for user input. Using a keyboard, the user enters values for customer name, address and telephone number, and then with the keyboard or a pointing device selects the push-button marked "Add" 360 to indicate that data entry is complete and that a new customer is to be created.

The user interface program 368 detects the push-button selection event and from this determines that the Add_Customer operation of the customer Surrogate Object Type is to be invoked. The user interface program 368 then maps data values from the fields in the application window 352 to corresponding fields in the requester send buffer 376 and the Operation Requester module 378 is invoked with values for SOT.name="Customer" and operation.name="Add_Customer" as shown at 950 in the flowchart in FIG. 11.

The Operation Requester module 378 then calls a series of functions of the Surrogate Object Manager 390. First, the Operation Requester module 378 calls the Create Operation Activation function using the SOT.name and operation.name as shown at block 952 in FIG. 11. This function loads the Customer Surrogate Object Type structure 244 from storage if not already loaded and creates an Operation Activation structure with its operation activation record associated with the operation Add_Customer. The Operation Activation structure is created with the appropriate input and output argument value group structures and argument value slots initialized to spaces ready for use.

Upon completion, the Create Operation Activation function returns the activation_ID of the newly created operation activation record to the Operation Requester 378. Scenario 1 does not include the use of surrogate object instances so a surrogate object instance.identifier is not passed to the Create Operation Activation function. Had this been done, the Create Operation Activation function would have initialized all instance-mapped input arguments based on mapped predicate values from the core entity of the surrogate object instance.

Figure 11A:
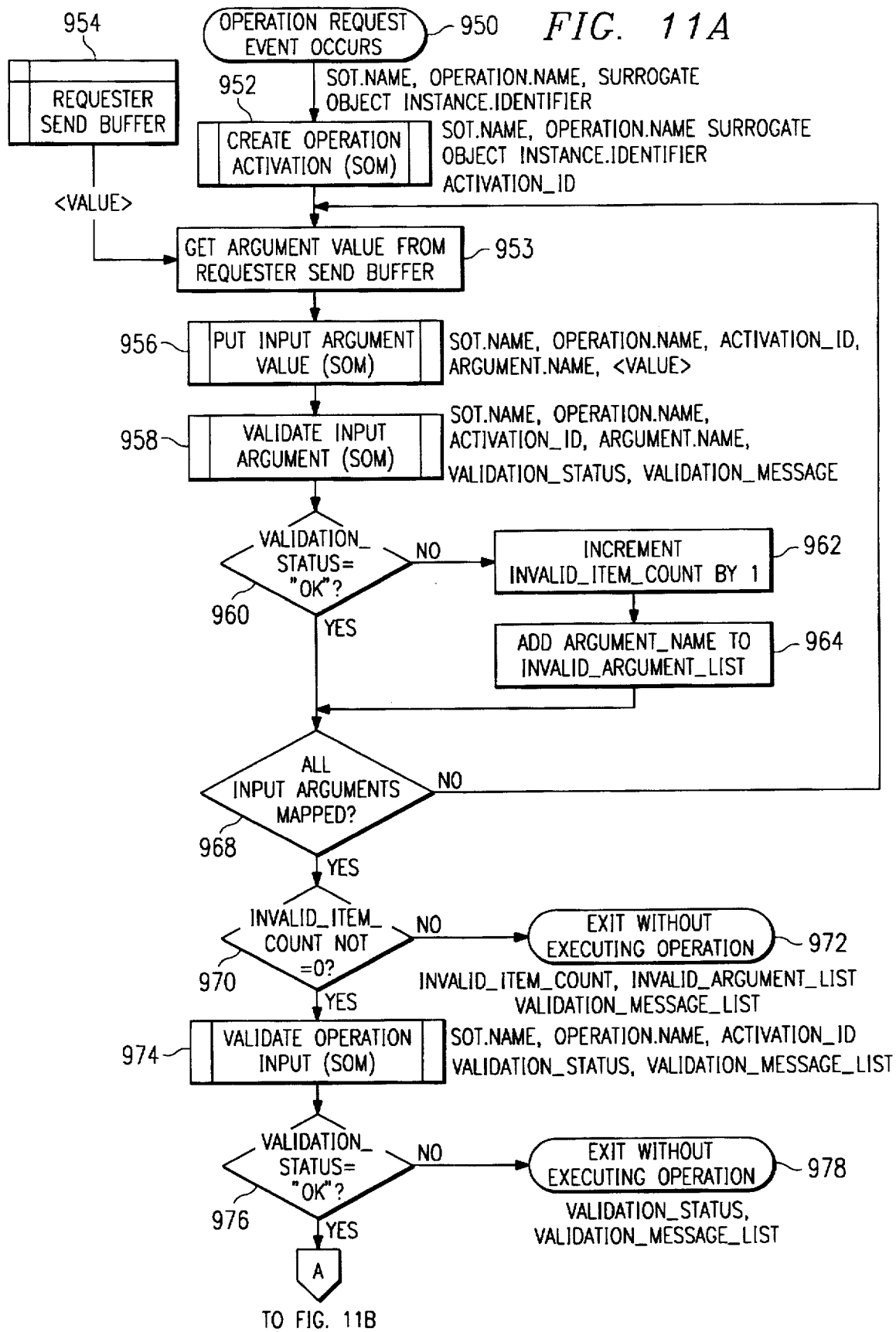
FIGS. 11A-B is a logic flowchart of an exemplary Operation Requester in accordance with one embodiment of the present invention.
Figure 11B:
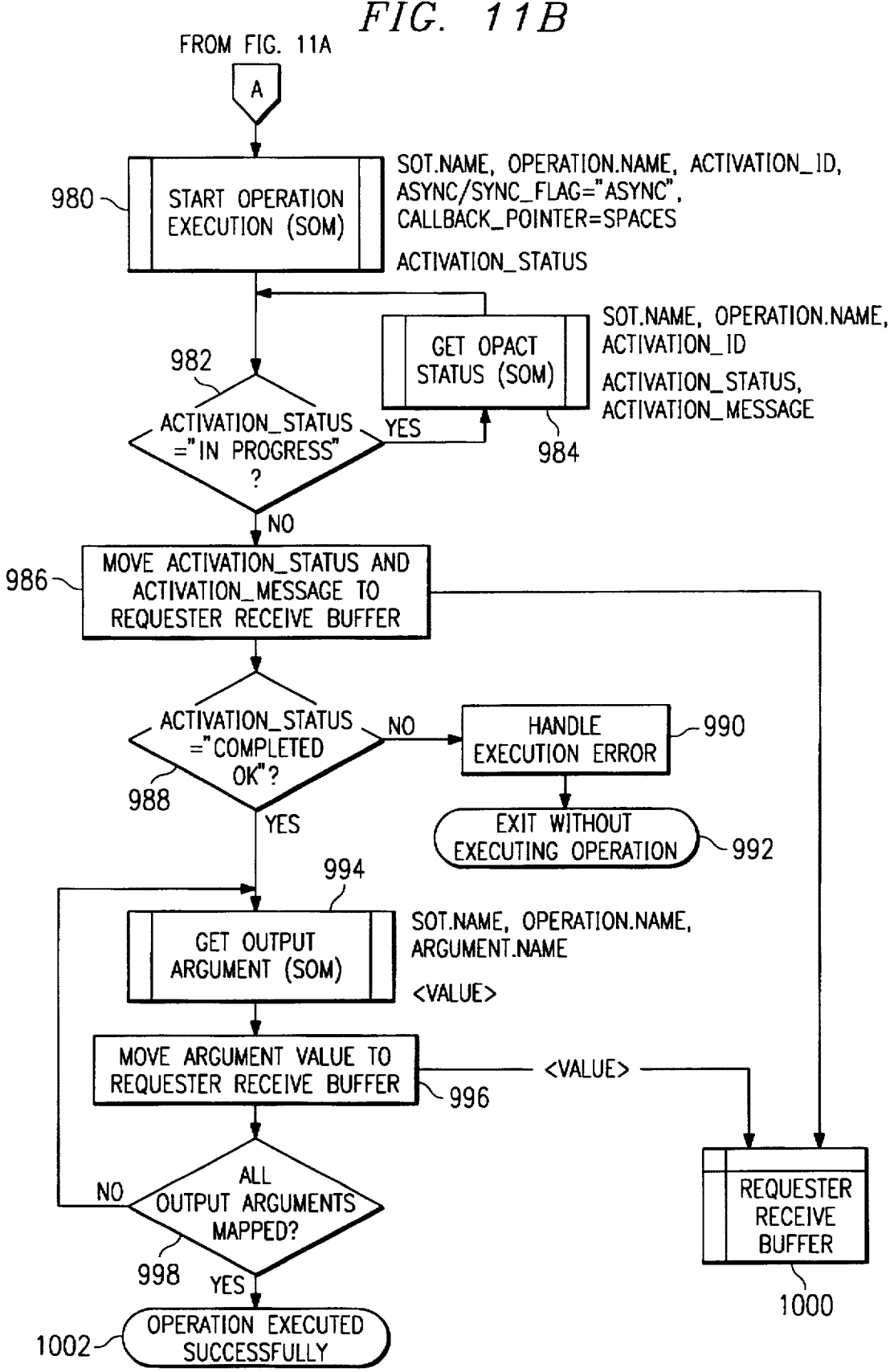

The Operation Requester 378 now processes each input argument in turn, moving the value held for it in the Requester Send Buffer 954 to the corresponding input argument value slot in the Operation Activation structure as shown in the flowchart in FIG. 11 at blocks 953 and 956. This is done by calling the Put Input Argument function of the Surrogate Object Manager 390 for each argument with the current SOT.name, operation.name, activation_ID and the argument.name and the argument value retrieved from the Requester Send Buffer 954. At this point the customer name, "Digital Widgets Inc." and address, "2560, Highland Blvd., Plano, Tex." and phone number, "214 575 5000" are stored in input argument value slots in the Operation Activation structure.

Each of these argument values is validated according to the validation_rule properties of the associated input argument object and its associated predicate object in the Surrogate Object Type structure 244 using the Validate Input Argument function in the Surrogate Object Manager 390 as shown at block 958. This module returns a validation_status and validation_message to the Operation Requester 378 which can now take appropriate action if the input argument value is invalid as determined at decision block 966. Once all input arguments have been transferred to the Operation Activation structure at decision block 768, the operation's validation_rule can be invoked using the Validate Operation Input function at block 974. The operation's validation_rule might include expressions which involve more than one argument.

Precisely how validation errors are handled may vary depending on the design requirements of the user interface program 368 and the Operation Requester 378, although the normal case might be to abandon processing the operation request and to advise the user interface program that a validation error has occurred. The logic shown in the flowchart in FIG. 11 illustrates the creation of an invalid argument list which is returned to the user interface program 368 for processing as required.

Once the input arguments have been validated successfully and if no errors have been found at decision block 976, the Surrogate Object Manager 390 Start Operation Execution function is called at block 980 with the SOT.name, operation.name and activation_ID, with no callback_pointer and the async/sync_flag="async".

The Start Operation Execution function allows an operation to be invoked either synchronously—with no response until the operation completes or an error occurs, asynchronously with call-back of a user-supplied module by the Operation Connection Manager 394 or 426 on operation completion or error, or asynchronously with polling where detection of completion is handled by the Operation Requester 378 polling for change in activation_status.

In both scenarios described hereinabove, the Start Operation Execution function is called with no callback_pointer and in the asynchronous mode. With either of the asynchronous approaches, the user interface program 368 and/or the Operation Requester 378 can be designed to allow multiple, potentially long running operations to be started without waiting for the first to have completed. The operation of the Operation Requester 378 as illustrated in the flowchart shown in FIG. 11 shows a polling approach to detect operation completion.

Figure 12:
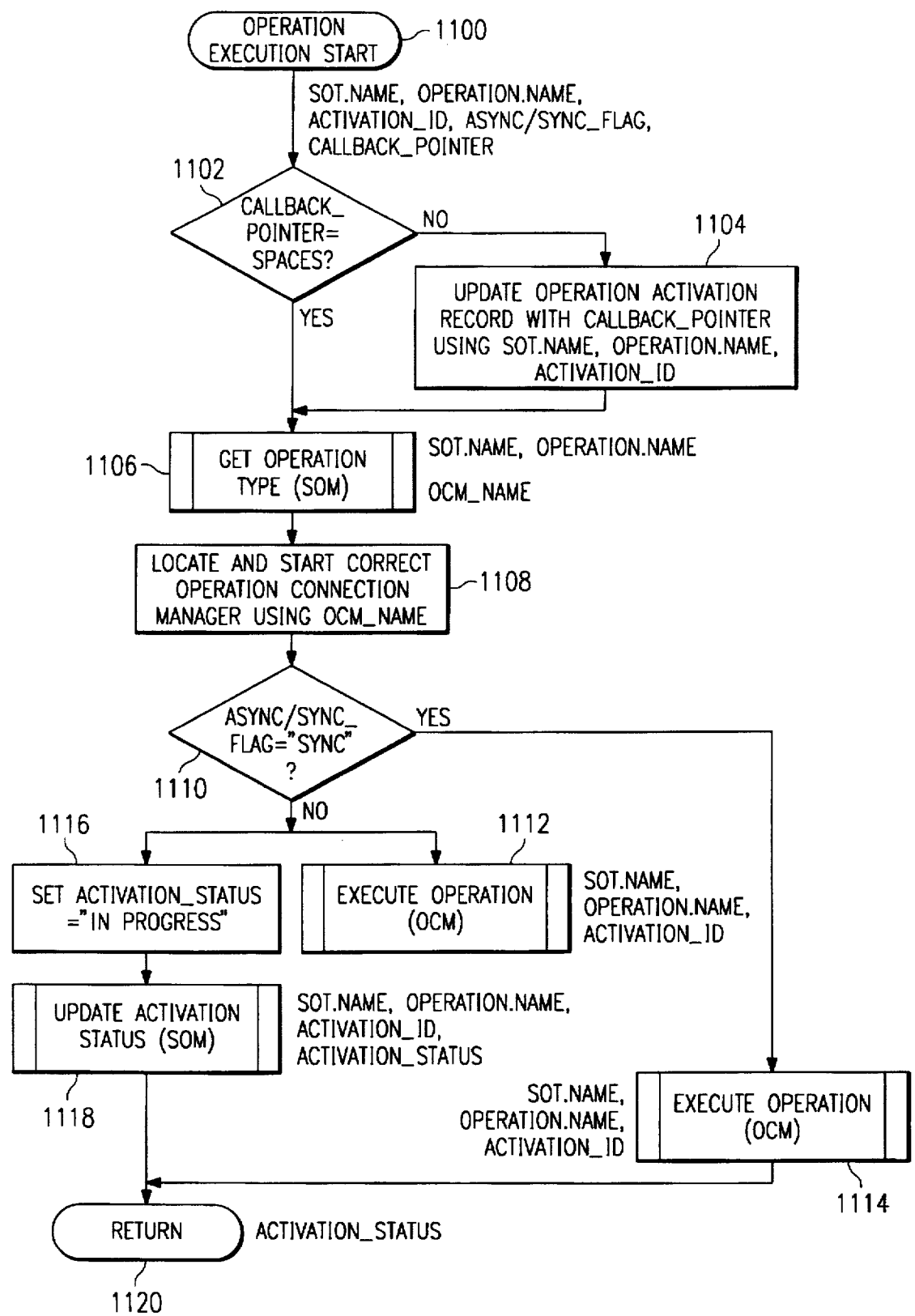
FIG. 12 is a logic flowchart of an exemplary Start Operation Execution function of the Surrogate Object Manager in one embodiment of the present invention.

The narrative continues with the description of the Start Operation Execution function of the Surrogate Object Manager 390 as illustrated in the flowchart in FIG. 12. Had a callback_pointer been provided, at decision block 1102 the Start Operation Execution function in the Surrogate Object Manager 390 would update the equivalent property on the current operation activation record as shown at block 1104. In all cases, the Start Operation Execution function invokes the Get Operation Type function at block 1106 using the SOT.name and operation.name to get the name of the correct Operation Connection Manager 394 or 426.

The returned OCM_name is then used to locate and start the appropriate Operation Connection Manager 394 or 426 at block 1108. Once the correct Operation Connection Manager 394 or 426 is started, the Execute Operation function is called at block 1112 with the SOT.name, operation.name and activation_ID. If the input async/sync_flag value is "async" at decision block 1110, the call to the Execute Operation function at block 1112 is asynchronous so the logic in Start Operation Execution does not wait for a response back from the Operation Connection Manager 394 or 426 before calling the Update Activation Status function at 1118 to set the activation_status on the Operation Activation record to "in progress" and to then return control to the Operation Requester 378.

This narrative continues with the Execute Operation function in the Operation Connection Manager 394 or 426, as described in the flowchart shown in FIG. 13.

In overview, the Execute Operation function is responsible for mapping the input arguments stored in the Operation Activation Structure into a message suitable for transmission to the operation, for the execution of the operation and for generating a mapping of the returned arguments in the message into the output arguments in the Operation Activation. The Execute Operation function then updates the activation_status on the Operation Activation record to indicate that the operation has completed successfully. This process involves calling several functions within the Surrogate Object Manager 390.

The Execute Operation function first gets a list of the operation's input arguments by calling the Get Input Arguments function at block 1204 with SOT.name and, operation.name. This returns a list of arguments in the same sequence as stored in the Catalog database 64. The sequenced list allows the Operation Connection Manager 394 or 426 to retrieve the arguments from the Operation Activation Structure in the sequence required by the operation.

Each input argument value is retrieved from the Operation Activation structure by calling the Get Input Argument Value function of the Surrogate Object Manager 390 using the SOT.name, operation.name, activation_ID and the argument.name from the list above. Each retrieved value is processed at block 1208 using whatever input transformation rules 1210 are defined within the Operation Connection Manager 394 or 426 and the resulting transformed argument is added to the message in the Message Send Buffer 1212.

Once all the input arguments have been transformed and the message is ready at decision block 1214, the operation's execution_name and execution_parameters are retrieved from the Surrogate Object Type structure 244 by calling the Get Operation Details function of the Surrogate Object Manager 390 using the SOT.name and operation.name at block 1216. In this scenario, the operation's execution_name is CUSTOMER.EXE and the execution_parameter is "Add". Using this information the operation is executed and the message sent to it at block 1218.

If no system error is detected at decision block 1220, the Operation Connection Manager 394 or 426 waits for a response from the operation. Various approaches can be used to handle this situation. Operation requests and responses can be handled synchronously or asynchronously. The choice may depend on many factors, including the type of communications protocol available between the Operation Connection Manager 394 or 426 and the operation execution environment. However, this choice does not affect the operation of the present invention beyond possibly limiting the throughput if communications are synchronous and operation response times are slow. If well implemented, the operation of the present invention should not add any significant overhead to operation response time.

In the meantime the operation executes using the message passed to it as input. In this scenario, the Composer Operation Connection Manager 394 uses a Composer Communications Module 406 and message protocol on top of various standard communications protocols such as LU6.2 or TCP/IP in order to execute the Customer Operation Package, CUSTOMER.EXE 412. CUSTOMER.EXE 412 starts and receives the message and uses the value in the command field to direct the logic flow to the Add_Customer operation.

The Add_Customer operation executes using the arguments customer name, customer address and customer phone number transferred in the body of the message, and a new customer record is added to the Customer database 422. The logic of the Add_Customer operation in this scenario is responsible for determining the new customer number. The customer number 10022 is assigned. This number, together with the other input arguments, are formatted into the output message, together with an application response code which indicates successful execution and the message, "Customer added successfully", are included in the returned message.

The Operation Connection Manager 394 or 426 meanwhile has been waiting for the operation to respond and to receive the returned message into the Message Receive Buffer 1232. The Operation Connection Manager 394 or 426 must be able to detect whether an error condition has arisen either with the operation execution (it may have failed and so will not respond) or in the communications infrastructure between the Operation Connection Manager 394 or 426 and the operation at decision block 126.

It is possible that the communications infrastructure may give a positive notification of a communications error or it may be determined that an error has occurred based on a pre-determined period of time having elapsed without a response.

It is also possible that an application error may have occurred where the application has executed and responded but has nonetheless detected an error condition and likely has not fulfilled the function for which it was designed. This may result from an input data validation check failing or any other application-detected condition.

To ensure it is possible to detect when such a situation has occurred, the preferred embodiment of the present invention provides that the returned message includes an application error argument and message. If the format and content of the application error argument and message are kept the same for all operations of the same type, then detection of this can be easily incorporated into the Operation Connection Manager 394 or 426. If not, operation-specific rules could be written and evaluated to determine whether an error has occurred. Such rules could be coded into the logic of the Operation Connection Manager 394 or 426 or held externally and loaded as required.

The flowchart illustrated in FIG. 3 shows at blocks 1223, 1228 and 1230 and at decision block 1226 where system error detection, time-out detection and application error detection should occur in the logic and how such errors should be handled. In each case, the activation_status property of the operation activation record must be updated appropriately before termination. This is done by calling the Update Activation Status function of the Surrogate Object Manager 390 at block 1246 with the SOT.name, operation.name and activation_ID, supplying an appropriate status code ("system error" or "application error") and any explanatory error message text either received from the Composer Communications Module 406 or generated by the Composer Operation Connection Manager 394.

If no error condition is detected, then the arguments in the Message Receive Buffer 1232 are mapped into the appropriate output argument value slots in the appropriate Operation Activation structure. This is similar to the process in which the input message was created. A sequenced list of output arguments is obtained from the Surrogate Object Type structure 244 by calling, at block 1236, the Get Output Arguments function of the Surrogate Object Manager 390. Using the output transformation rules either coded into the Composer Operation Connection Manager 394 logic or loaded, if stored externally, each argument is transformed in turn in block 1238 and placed into the Operation Activation structure by calling, at block 1240, the Put Output Argument Value function of the Surrogate Object Manager 390 with SOT.name, operation.name, the output argument.name and the transformed value.

Once all the output arguments have been processed at decision block 1242, the operation activation activation_status property is updated as shown in block 1244 by calling, at block 1246, the Update Activation Status function of the Surrogate Object Manager 390 with SOT.name, operation.name, activation_ID and the activation_status "completed OK" and the activation_message text based on any application message returned from the operation. In this case, the message received from the operation is "Customer added successfully".

If the operation completes successfully, as determined at decision block 1248, the Operation Connection Manager 394 calls at block 1250 the Map Operation Output To Instances function in the Surrogate Object Manager 390, although this will have no effect in scenario 1 as instance mapping is not enabled. The Get Callback Pointer function of the Surrogate Object Manager 390 is used at block 1252 to determine, at decision block 1254, if a call-back module has been specified. If so, this module is located and started at block 1256 before the Operation Connection Manager 394 completes this particular operation execution cycle. Again, in scenarios 1 and 2 no callback_pointer is used.

In this scenario, the operation was called asynchronously so a change of activation_status from "in progress" to any of the values set by the Operation Connection Manager 390 is detected by the Operation Requester 378 by repeatedly calling the Get Activation Status function of the Surrogate Object Manager 390. Once this change is detected, the Operation Requester 378 continues processing this operation activation. (The Operation Requester 378 or the user interface program 368 can be designed to continue with some other tasks until the change of status is detected if desired). This logic is shown in the flowchart in FIG. 11.

The changed activation_status at decision block 982 and activation_message are moved to the Requester Receive Buffer 1000 at block 986 so that they can be accessed by the user interface program 368. In this scenario, the "completed OK" activation_status is expected and the activation_message will be "Customer added successfully".

If the activation_status had not been "completed OK" at decision block 988, then an error condition has occurred. How this is handled at block 990 can vary depending on the detailed design of the Operation Requester 378 and the user interface program 368. In most cases the error condition will be passed back to the user interface program 368 which will inform the user that an error occurred and advise the user to seek assistance to resolve the problem.

If the activation_status is "completed OK" at decision block 988, the Operation Requester 378 now retrieves each of the returned arguments. This is done by repeatedly calling at block 994 the Get Output Argument function of the Surrogate Object Manager 390 using SOT.name, operation.name, activation_ID and each output argument.name. Each returned argument value is moved, at block 996, into the appropriate field in the Requester Receive Buffer 1000. Once all the arguments have been retrieved, the Operation Requester 378 terminates.

At this point the user interface program 368 logic will update the user interface with the updated fields and display the "Customer added successfully" message from the Operation Requester Receive Buffer 374. However, in this scenario, before returning control to the user, the user interface program 368 checks to see if there is an entry for the newly added customer, Digital Widgets Inc., in the credit database 444. This is done by invoking the Operation Requester 378 again, this time to invoke the Get_Customer_Credit_Rating operation. The sequence of events described hereinabove is now repeated, only this time the Operation Requester 378 is called with SOT.name="Customer" and operation.name="Get_Customer_Credit_Rating".

The subsequent steps described hereinabove are followed, creating an Operation Activation structure and moving the customer name in as an input argument value. This time, however, the Get_Customer_Credit_Rating operation type held in the Surrogate Object Type structure 244 is found to be "3270" (also shown in FIG. 9), causing the Start Operation Execution function in the Surrogate Object Manager 390 to start the 3270 Operation Connection Manager 426 rather than the Composer Operation Connection Manager 394. This module will load the script in the script file 432 based on the execution_parameter "cucredit.scr" stored for Get_Customer_Credit_Rating. This includes the instructions for logging onto the 3270 host system and executing the "CUCREDIT" transaction 440.

The customer name, Digital Widgets Inc., is entered into a screen field according to the layout information included in the script file 432 and a 3270 control code issued to execute the transaction 440.

The CUCREDIT transaction 440, unaware that the execution request has not come from a dumb terminal, searches the credit database 444 for an entry for Digital Widgets Inc. and, upon finding it, returns the credit rating value, "AAA" which is passed back via the 3270 Operation Connection Manager 426, the Surrogate Object Manager 390, the Operation Activation structure and the Operation Requester 378 to the user interface program 368. The user interface display is updated with this value, control is returned to the user and scenario 1 is complete.

Executing Operations at Runtime; Scenario 2

In the second scenario, as supported by the embodiment of the present invention shown in FIG. 7, the use of Surrogate Object Instances is described. This combines with the procedures described in scenario 1 to offer additional facilities to the designer of the Operation Requester 582 and the user interface program 572. FIG. 7 highlights the elements of the present invention that are used in this scenario and depicts the appearance of the user interface and the data flows involving the Surrogate Object Instance structure.

In Scenario 2, the user requires to see a list of customers and then to examine the details of a customer selected from the list. These details should include those attributes stored in the customer database 640 and the credit rating on the credit database 660. Two application windows 562 and 594 are used for the list and for the detailed information, respectively.

In this scenario the list of customers is maintained as a set of surrogate object instance records within a surrogate object instance structure by the Surrogate Object Manager 614 rather than within the user interface program 572. When details of an individual customer are requested, this request is processed as an operation request against a specific surrogate object instance. When the additional detail information is returned from the operation, it is mapped to the appropriate entity in the Surrogate Object Instance structure and those predicate value slots which have been instance-mapped to the Get_Customer_Details operation output arguments are set or updated. If Surrogate Object Instance persistence between sessions is required, this can be provided by the Surrogate Object Manager 614, thus allowing a session to be interrupted and continued later.

Use of a Surrogate Object Instance structure is possible only if a Surrogate Object Type structure 244 has been created which represents some type of thing which can be uniquely identified in the output arguments of operations. This is accomplished by establishing a core entity type with an identifier which is represented in the output arguments of one or more of the included operations. Output argument values returned by the execution of operations are used either to create or to update surrogate object instances and related entity records; each surrogate object instance represents an occurrence of the type of thing represented by the Surrogate Object Type.

All surrogate object instances and their related entities based on the same Surrogate Object Type structure 244 are stored in the same Surrogate Object Instance structure. The Surrogate Object Instance structure can also store entities that are not core of the corresponding surrogate object type if these are also fully identified in the output of included operations. If arguments are returned that represent predicates which are relationships, then corresponding pairings will be defined between entities in the Surrogate Object Instance structure.

The Surrogate Object Instance structure is in effect a local database, comprising a set of inter-linked records which represent, for each surrogate object instance, the core entity and its predicate values which may include pairing references to other entities defined by the same or different entity types.

A set of standard Surrogate Object Manager 614 functions are provided which enable the Surrogate Object Instance structure to be browsed, including functions that return individual entities and their predicate values and allow navigation of the structure following relationship pairings between individual entities according to their relationship type.

Operations defined within the Surrogate Object Type which require an instance of the core entity type to be identified as part of their input argument set can be invoked using a surrogate object instance as the subject. This enables surrogate object instances to be used as encapsulated objects which provide standard behavior defined by the operations defined in the Surrogate Object Type.

This "instance management" capability simplifies the calling of operations for the Operation Requester 582 and the user interface program 572 and provides a more natural object-oriented approach to the construction of these components.

Both scenarios use the same Surrogate Object Type structure 244. "Customer" is the type of thing represented by the Surrogate Object type so individual occurrences of this type, i.e. individual customers, will be represented by surrogate object instances in the Surrogate Object Instance structure.

In the second scenario, to enable instance management, the Surrogate Object Definition Module 96 is used to set the instance_mapping_flag on the root surrogate object type record of the Customer Surrogate Object Type structure 244 to "yes".

In addition, the List_Customers and Get_Customer_Details operations are inspected and predicate instance mapping records created for the output arguments of both so that they will be mapped to predicate values.

Furthermore, a predicate instance mapping is created for the input argument customer_number of Get_Customer_Details. This allows the Get_Customer_Details operation to be invoked using a surrogate object instance as the subject. Once these assignments have been defined the updated Surrogate Object Type structure 244 is saved ready for use.

FIG. 7 illustrates the application windows 562 and 594 used in this scenario and shows the data flow among between the application windows 562 and 594, the Operation Requester 582, the Surrogate Object Instance structure and the Operation Activation structure. The flows between the Operation Activation structure and the operations have been omitted from FIG. 7 for clarity as they are essentially the same as those depicted in FIGS. 5 and 6. (List_Customers and Get_Customer_Details are used in place of Add_Customer, in scenario 1).

Listing the customers

The user initiates the user interface program 572 which uses the Operation Requester 582 as described before to invoke the List_Customers operation. This operation is executed in the same manner as described hereinabove in the first scenario. However, when the Operation Connection Manager 618 or 642 invokes the Map Operation Output to Instances, as shown in the flowchart in FIG. 13, this function will examine the output argument values created in the Operation Activation and for each repeated pair of customer__number and customer__name arguments, try to match the customer__number with a corresponding predicate value slot of a customer entity in the Surrogate Object Instance structure.

For each match that is found the value for customer__name will be mapped into a predicate value slot. If a match is not found, a new surrogate object instance and core entity is created and its slots corresponding to the number and name predicates populated from the output argument values. Mapping__rules defined for either argument would be processed immediately prior to the matching.

Once the list operation has executed successfully, the user interface program 572 calls the Surrogate Object Manager 614 directly (not via the Operation Requester 582) to retrieve the instances for formatting and display as a list. Calling the function Get List Of SOIs returns the identifier of each surrogate object instance together with the identifying predicate values (customer number is assumed to be the identifying predicate in this scenario). The list application window 562 requires the name and number of each customer to be displayed so the function Get SOI Details is called using each SOI.identifier in turn to retrieve each customer's name property. These are formatted into the list and control returned to the user.

Getting Details of a Selected Customer

The user selects a customer from the list using a mouse pointing device or other means provided by the user interface program 572. The user signifies that further details are required for the selected customer and the user interface program 572 calls the Operation Requester 582 in a manner similar to scenario 1, only this time providing the SOI.identifier of the selected customer instance.

The Operation Requester 582 passes this information to the Create Operation Activation function of the Surrogate Object Manager 614 which uses it to locate the customer instance in the Surrogate Object Instance structure and, using the predicate instance mappings for the Get__Customer__Details import arguments stored in the Surrogate Object Type structure 244, populates the customer number argument value in the Operation Activation Structure before returning control to the Operation Requester 582.

Because Get__Customer__Details only takes the single argument customer number, as shown in FIG. 8, the Operation Requester 582 need not map any further arguments into the Operation Activation Structure, and the operation is invoked in the normal way described in scenario 1 discussed hereinabove. Had the operation required additional arguments, then these may either have been mapped from the surrogate object instance (if predicate instance mapping records had been defined) or would be mapped by the Operation Requester 582, typically, from data values input by the user.

Once the Get__Customer__Details operation has executed, the Map Operation Output To Instances function called by the Operation Connection Manager 618 or 642 maps the returned argument values to predicate value slots on the customer entity. Once the customer details have been retrieved from the customer database the credit rating is sought from the credit database. This is retrieved in much the same way via the Operation Requester 582, only this time calling the Get__Customer__Credit__Rating operation, again, using the SOI.identifier for the selected customer.

Depending on the implementation chosen for the user interface program, retrieval of the customer data and the credit data could be done in sequence or in parallel. As described hereinabove it is not required that a response is received from one operation before invoking another. If, for example, retrieval of the credit rating from a remote data source takes an unpredictable, but often long, period of time, the user interface program 572 could be designed to invoke both operations immediately one after the other and then to display the retrieved data from the customer database 640 as soon as it is received, and then to update the display with the credit rating value as and when it is received.

Saving And Restoring Instance Data

Once the user has signified that examination of the details is complete, the list window 562 is displayed again. Further customers could be selected and their details examined. Before exiting the list window 562 and terminating the application, the user is prompted to save the Surrogate Object Instance structure, including all the values retrieved by whatever operations have been executed. This is achieved by calling the Save SOI Structure function of the Surrogate Object Manager 614. On next execution of the user interface program 572, the user can be prompted to load the existing Surrogate Object Instance structure or to construct another.

Loading from persistent storage is accomplished by calling the Load SOI Structure function. The user's choice at this moment will depend on many factors including the likelihood and significance to the user of the data having changed on the customer database 640 or the credit database 660 since it was last retrieved and saved locally. Examination of the last__updated properties of entities concerned will assist the user determine if the instance data should be refreshed by executing operations again.

Various implementation approaches with regard this aspect of use of the invention are possible, these include: the user interface program 572 prompting the user to state whether or not the present invention should refresh the structure or use a saved structure each time it is started, the refresh being automatically performed each time the program is started, or the structure being refreshed automatically as part of the computer's start-up procedures each day.

Although the present invention has been described in detail, it should be understood that various changes, substitutions and alterations can be made thereto without departing from the spirit and scope of the present invention as defined by the appended claims.

What is claimed is:

1. A system for invoking an executable operation in a distributed system, comprising:

a Catalog for managing information including the executable operation, said information included in the executable operation including an associated operation type and an associated operation definition;

a Surrogate Object Definition Module coupled to the Catalog for presenting the information included in the executable operation to a user and for including the information included in to the executable operation in a Surrogate Object Type structure in accordance with instructions from the user;

a Surrogate Object Manager for interpreting the information in the Surrogate Object Type structure and for providing a set of functions, the set of functions operable to enable examination of the information in the Surrogate Object Type structure and to initiate execution of the executable operation by generating an Operation Activation structure in accordance with the associated operation definition in response to a request, the Operation Activation structure including data required for the execution of the executable operation;

an Operation Requestor, using the set of functions provided by the Surrogate Object Manager, operable to request generation of the Operation Activation structure, to store the data required for the execution of the executable operation in the Operation Activation structure and to generate the request to initiate execution of the executable operation in accordance with the data in the Operation Activation structure and to retrieve returned data from the Operation Activation structure upon completion of the execution of the executable operation; and an Operation Connection Manager responsive to the Surrogate Object Manager for invoking execution of the executable operation in accordance with the information in the Operation Activation structure.

2. The system of claim 1 wherein the Surrogate Object Type structure comprises a set of linked data records of a predefined type.

3. The system of claim 1 further including an Application Development Tool operable to assist the user in constructing the Operation Requestor.

4. The system of claim 1 wherein the associated operation definition includes information defining input and output arguments of the executable operation and validation requirements of the input and output arguments of the executable operation.

5. The system of claim 1 wherein the Catalog includes:
   an Operation Enrollment Module for accepting and storing the information related to the executable operation in a Catalog database and for equating the input and output arguments of the executable operation with arguments of another executable operation using common predicates;
   a Catalog Manager for providing a set of access and data storage functions, the set of access and data storage functions enabling the user to add, update and delete records in the Catalog database; and
   a Catalog Editor for maintaining the information in the Catalog database.

6. The system of claim 5 wherein the Surrogate Object Definition Module is operable to present the information related to the executable operation to the user in terms of the common predicates.

7. The system of claim 1 wherein the Surrogate Object Type structure includes instance mapping information, and the Surrogate Object Manager is further operable to equate the input and output arguments of the executable operation with values of a predicate included in a Surrogate Object Instance in accordance with the instance mapping information upon completion of the execution of the executable operation and means enabling access to Surrogate Object Instance data.

8. The system of claim 1 wherein the Surrogate Object Type structure is independent of the hardware platform, operating system, database management system and programming language used in implementing the executable operation.

9. The system of claim 1 wherein the Operation Connection Manager initiates the execution of the executable operation synchronously in response to the request from the Operation Requestor.

10. The system of claim 1 wherein the Operation Connection Manager initiates the execution of the executable operation asynchronously in response to the request from the Operation Requestor.

11. The system of claim 1 wherein the executable operation and the Operation Requestor are implemented in homogeneous operating environments.

12. The system of claim 1 wherein the executable operation and the Operation Requestor are implemented in heterogeneous operating environments.

13. A method for invoking an executable operation in a distributed processing system, comprising:
   accepting information describing the executable operation, the information including an associated operation type;
   storing the information describing the executable operation in a Catalog;
   presenting the information related to the executable operation to a user;
   accepting instructions from the user for incorporating the information describing the executable operation into a Surrogate Object Type structure;
   providing a set of functions for interpreting the information in the Surrogate Object Type structure, for enabling examination of the information in the Surrogate Object Type structure and for initiating execution of the executable operation by generating an Operation Activation structure in accordance with the associated operation definition in response to a request from the user;
   constructing an Operation Requestor operable to, using the functions, request generation of the Operation Activation structure, store data required for the execution of the executable operation in the Operation Activation structure, to generate the request to initiate execution of the executable operation in accordance with the data in the Operation Activation structure and to retrieve returned data from the Operation Activation structure upon completion of the executable operation; and
   invoking execution of the executable operation in accordance with the information in the Operation Activation structure.

14. The method of claim 13 wherein the step of accepting information defining the associated operation type includes the step of accepting information defining the association of the executable operation with other executable operations with common execution and data passing protocols.

15. The method of claim 13 wherein the step of accepting information information defining the execution requirements of the executable operation includes the step of accepting information defining input and output arguments of the executable operation and validation requirements of the input and output arguments of the executable operation.

16. The method of claim 13, further comprising:
   storing instance mapping information in the Surrogate Object Type structure; and
   equating input and output arguments of the executable operation with predicate values included in a Surrogate Object instance in accordance with the instance mapping information in response to completion of the execution of the executable operation.

17. The method of claim 13, wherein the step of initiating the execution of the executable operation includes the step of initiating the execution of the executable operation synchronously in response to the request from the Operation Requestor.

18. The method of claim 13 wherein the step of initiating the execution of the executable operation includes the step of initiating the execution of the executable operation asynchronously in response to the request from the Operation Requestor.

19. The method of claim 13 wherein the step of initiating the execution of the executable operation includes the step of initiating the execution of the executable operation in a homogeneous operating environment with respect to the Operation Requestor.

20. The method of claim 13 wherein the step of initiating the execution of the executable operation includes the step of initiating the execution of the executable operation in a heterogeneous operating environment with respect to the Operation Requestor.

* * * * *